United States Patent [19]

Filion et al.

[11] Patent Number: 5,081,699
[45] Date of Patent: Jan. 14, 1992

[54] PROGRAM AHEAD FILE TRANSFER IN A REPRODUCTION MACHINE

[75] Inventors: Joseph L. Filion, Rochester; Thomas J. Herceg, Pittsford; Gregory C. Sosinski, Penfield, all of N.Y.

[73] Assignee: Xerox Corporation, Stamford, Conn.

[21] Appl. No.: 252,471

[22] Filed: Oct. 3, 1988

[51] Int. Cl.⁵ .................................... G06F 15/62
[52] U.S. Cl. .................................... 395/145; 395/117; 355/206
[58] Field of Search ............... 364/518, 519, 520, 521; 340/706, 709, 712, 715, 734; 355/200, 202, 204, 206, 209

[56] References Cited

U.S. PATENT DOCUMENTS

| | | | |
|---|---|---|---|
| 4,248,528 | 2/1981 | Sahay | 355/14 R |
| 4,310,235 | 1/1982 | Lorenzo et al. | 355/6 |
| 4,453,821 | 6/1984 | Smith | 355/14 C |
| 4,521,870 | 6/1985 | Babbel et al. | 364/900 |
| 4,639,881 | 1/1987 | Zingher | 364/518 X |
| 4,711,556 | 12/1987 | Abuyama | 355/14 R |
| 4,711,560 | 12/1987 | Hosaka et al. | 355/14 C |
| 4,742,483 | 5/1988 | Morrell | 364/900 |
| 4,780,806 | 10/1988 | Wada et al. | 355/200 X |
| 4,806,978 | 2/1989 | Nakatani et al. | 355/202 |
| 4,899,138 | 2/1990 | Araki et al. | 340/712 |

Primary Examiner—Heather R. Herndon
Attorney, Agent, or Firm—Ronald F. Chapuran

[57] ABSTRACT

A technique for pre-programming a reproduction machine at a console screen for a plurality of complex jobs by simulating a plurality of pre-programming slots in memory and machine features for each slot corresponding to required job runs and automatically storing the selected features in the pre-programming slots, including the means to transfer the stored features from one memory slot to another memory slot and the means to transfer the stored features to a removable media such as a floppy disk. The floppy disk can be inserted into another reproduction machine to automatically pre-program that machine for a plurality of job runs.

15 Claims, 23 Drawing Sheets

5,081,699

PROGRAM AHEAD FILE TRANSFER IN A REPRODUCTION MACHINE

BACKGROUND OF THE INVENTION

The invention relates to a system for pre-programming reproduction machines such as copiers and printers, and more particularly, to pre-programming file transfer and storage functions for such reproduction machines.

As reproduction machines such as copiers and printers become more complex and versatile in the jobs they can do, the user interface between the machine and the operator or user must necessarily be expanded if full and efficient utilization of the machine is to be realized. A suitable interface must not only provide the controls, displays, and messages necessary to activate, program, monitor, and maintain the machine, but must do so in an efficient, relatively simple, and straightforward way. For if the user interface fails in this respect, the abilities that were designed and built into the machine and which the machine owner pays for, may never be realized.

Additionally, in more complex machines, various operator skill levels must typically be provided for. At one extreme is the dedicated user; that is, the user whose principal task is to run copying jobs and/or supervising others who do. This type of operator typically requires extensive and costly training in order to become fully skilled in all the potential programming possibilities and operating situations that are possible. At the other extreme is the casual user whose principal task is running copies and doing relatively simple jobs such as jam clearance, consumable replacement, and the like. This latter type of operator requires only minimal training, and typically comprises the smallest group of operators for the machine. Intertwined with the need to accommodate operators of these and other skill levels and training is the need to maximize productivity and ease of use while enabling successful operation, not only in the country of origin but also in foreign countries where the machine is intended to be marketed.

Unlike simple copiers, in which the only visible operator controls may be a copy count selector for the number of copies, and "ON", "OFF", and "START" buttons, a modern sophisticated copier may present the operator with a large and confusing display of a large number of additional switches, buttons, dials, lights, instructions, etc.. To fully utilize the capabilities of the copying machine it may be necessary for the operator to locate and actuate various combinations of these manual switches and controls before the copying can commence. Furthermore, the operator may have to repeat this entire sequence of manual switch control steps for each desired copying job, even if that job is the same as ones previously run, e.g., a routine but unique printing job, such as a regular report, periodical, etc. If different copying functions or features are to be provided for different documents in a set or stack of documents to be copied it may be additionally necessary to interrupt each copying run and the feeding of the documents several times in order to change or reset various switches settings to the different processing desired.

It is a feature of the present invention to overcome various of the above and other related problems and to thereby make easier, and encourage, the utilization of the full capabilities of a modern copying apparatus. It is also intended to reduce the training or familiarization time required for the instructing of either regular or casual operators in the utilization of the copier. It will be seen that with the system disclosed herein, that the entire copier operation, including the most sophisticated variable function or feature copying run of which the copier is capable, may be fully controlled simply by the operator pre-programming the machine. The control will automatically switch the operation of the copier to the various other copying functions without the operator having to find or actuate any manual buttons or switches on the copier (other than possibly a "START" button). If different copying modes or functions are desired for different documents in a stack or run, different pre-programs may be inserted and the copier may thus be automatically switched between different modes of operation for different documents. That is, the operator may pre-program the set of originals simply by selected pre-programs. Thus, job editing or control is simplified and does not require switch or keyboard input, counting of originals, interruptions of copying runs, manual inserts, etc.

The prior art is replete with user interface systems. For example, the Xerox 5700 Electronic Printing System incorporates a touch control CRT screen providing button, key, and window images on the screen combined with text to give concise instructions to the operator. This system accepts magnetic cards, cassettes, and disks that store the documents to be printed and also the magnetic media can store control information to specify the output format for printing or to invoke special features such as merging or interleaving. The system software translates the coded data, formats the page, and generates the hard copy locally, or the system can transmit the data via a communication link to remote 5700 printing sites.

In the prior art, it is also known to be able to enter and store copying information in a reproduction machine. For example, U.S. Pat. No. 4,711,556 discloses a copying machine that allows for inputting copying instructions, means for temporary storage of these instructions, a display of these values, an interrupt mode that will let the operator input different copying instructions, a readout of the new instructions, and a means to return to the original mode settings once the interrupt is completed.

U.S. Pat. No. 4,711,560 discloses a copier which functions according to a sequence control program stored on floppy disk and loaded by a user. The floppy disk can also contain a diagnostic program to facilitate maintenance, and further act as a key to prevent unauthorized use of the copier. U.S. Pat. No. 4,742,483 discloses a laser printer including a microprocessor to read data or program information from a cartridge loaded by a user. A special maintenance operating system on the cartridge runs the printer through automatic routines to be checked by a technician.

U.S. Pat. No., 4,248,528 discloses a control system in which pre-printed and operator marked control sheets are fed past an optical scanner connected to the control system and the documents are copied according to the instructions on the control sheets.

U.S. Pat. No. 4,453,821 discloses a technique to configure a copier prior to a production run including a programmable, non-volatile memory for storing information corresponding to at least two different set-up configurations and a mechanism for selecting one of these configurations and configuring the copier in accordance with the selected configuration.

U.S. Pat. No. 4,310,235 discloses an operator console, a card reader, and a control for feeding pre-programming marked cards to the card reader for storing the programming information into RAM memory. A job stream feature permits the operator to place a plurality of different jobs into the machine for automatic reproduction and a job exception feature allows the machine to be automatically conditioned to deviate from the normal reproduction run. Features can also be programmed at the operator console, but the console inputs are inhibited once the programmed card has been inserted.

A difficulty with the prior art systems is the need to be able to easily modify job requirements in memory and transfer complicated job requirements from one pre-programming job slot or memory location to another job slot, and to be able to store and convey job requirements on portable storage media. An object of the present invention, therefore, is to provide a technique for pre-programming a reproduction machine for a plurality of future jobs involving a variety of machine features and requirements in a plurality of job slots in memory, and to be able to transfer job requirements or modified job requirements between job slots or to be able to transfer the job requirements to a portable storage media for transfer to and pre-program another machine. Further advantages of the present invention will become apparent as the following description proceeds, and the features characterizing the invention will be pointed out with particularity in the claims annexed to and forming a part of this specification.

SUMMARY OF THE INVENTION

Briefly, the present invention is concerned with a technique for pre-programming a reproduction machine at a console screen for a plurality of complex jobs by simulating a plurality of pre-programming slots in memory and machine features for each slot corresponding to required job runs and automatically storing the selected features in the pre-programming slots, including the means to transfer the stored features from one memory slot to another memory slot and the means to transfer the stored features to a removable media such as a floppy disk. The floppy disk can be inserted into another reproduction machine to automatically preprogram that machine for a plurality of job runs.

For a better understanding of the present invention, reference may be had to the accompanying drawings wherein the same reference numerals have been applied to like parts and wherein:

DETAILED DESCRIPTION OF THE DRAWINGS

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF THE PREFERRED EMBODIMENT

Figure 1:
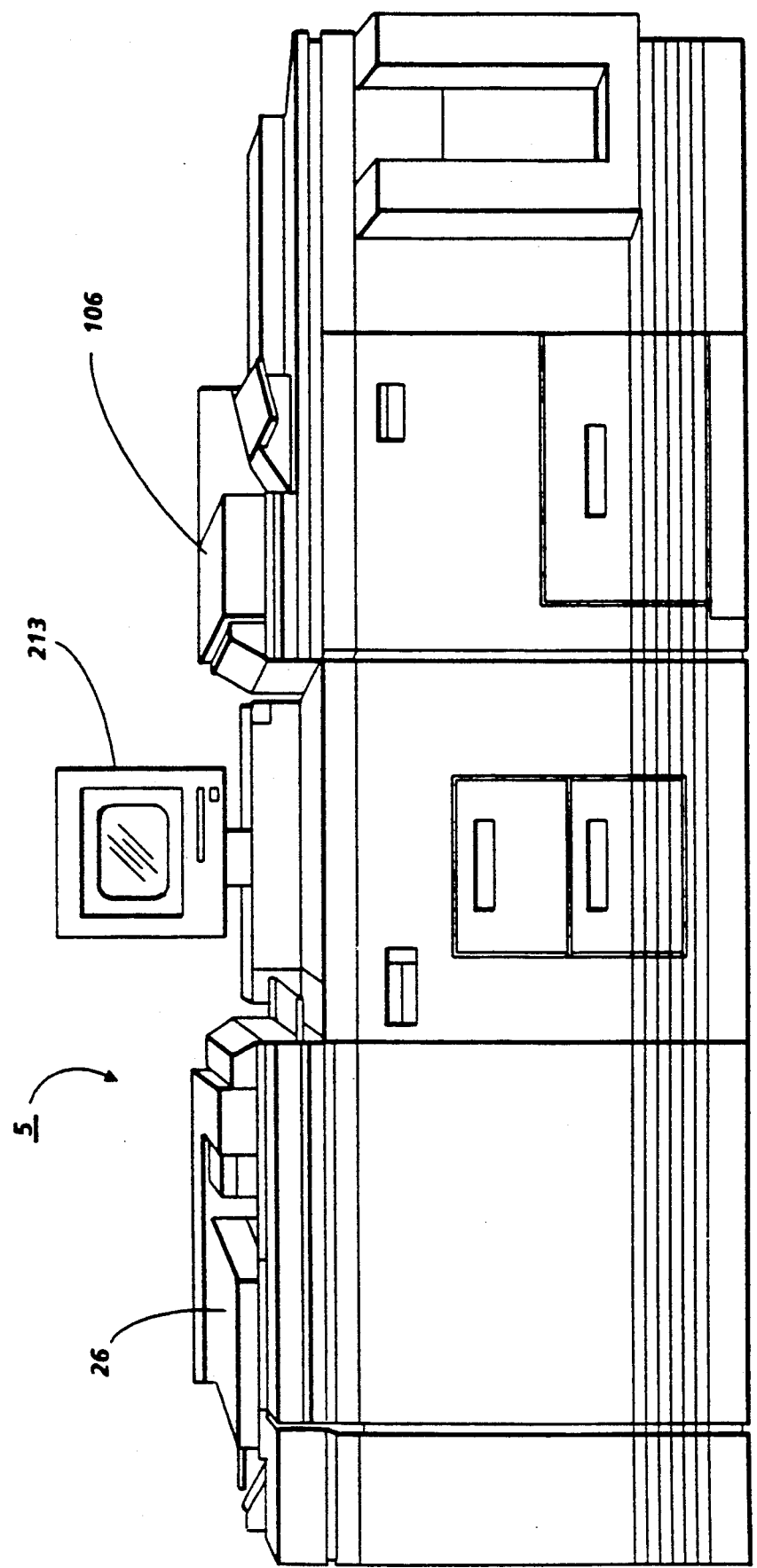
FIG. 1 is an isometric view of an illustrative reproduction machine incorporating the touch dialogue User Interface (U.I.) of the present invention.
Figure 2:
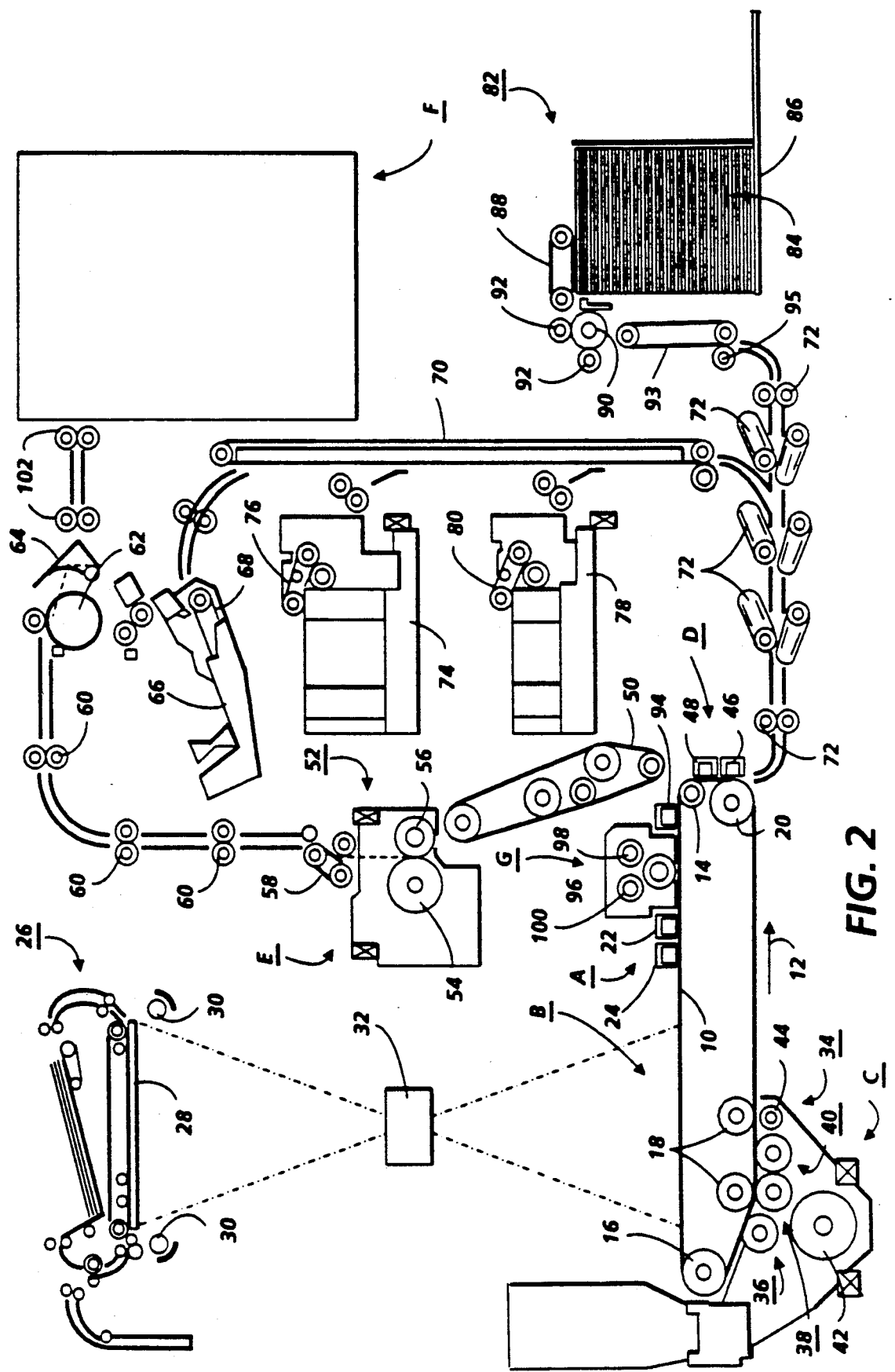
FIG. 2 is a schematic elevational view depicting various operating components and sub-systems of the machine shown in FIG. 1.
Figure 3:
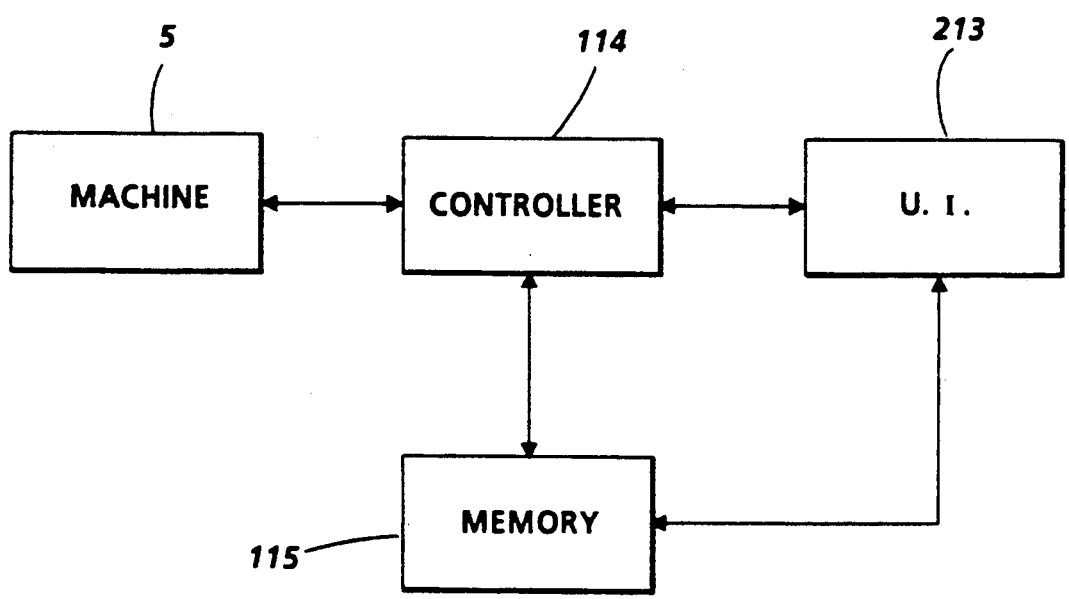
FIG. 3 is a block diagram of the operating control systems and memory for the machine shown in FIG. 1.

For a general understanding of the features of the present invention, reference is made to the drawings. In the drawings, like reference numerals have been used throughout to identify identical elements. Referring to FIGS. 1, 2, and 3, there is shown an electrophotographic reproduction machine 5 composed of a plurality of programmable components and sub-systems which cooperate to carry out the copying or printing job programmed through the touch dialogue User Interface (U.I.) of the present invention. It will become evident from the following discussion that the touch dialogue U.I. of the present invention may be employed in a wide variety of devices and is not specifically limited in its application to the particular embodiment depicted herein.

Machine 5 employs a photoconductive belt 10. Belt 10 is entrained about stripping roller 14, tensioning roller 16, idler rollers 18, and drive roller 20. Drive roller 20 is rotated by a motor coupled thereto by suitable means such as a belt drive. As roller 20 rotates, it advances belt 10 in the direction of arrow 12 through the various processing stations disposed about the path of movement thereof.

Initially, the photoconductive surface of belt 10 passes through charging station A where two corona generating devices, indicated generally by the reference numerals 22 and 24 charge photoconductive belt 10 to a relatively high, substantially uniform potential. Next, the charged photoconductive belt is advanced through imaging station B. At imaging station B, a document handling unit 26 sequentially feeds documents from a stack of documents in a documents stacking and holding tray into registered position on platen 28. A pair of Xenon flash lamps 30 mounted in the optics cavity illuminate the document on platen 28, the light rays reflected from the document being focused by lens 32 onto belt 10 to expose and record an electrostatic latent image on photoconductive belt 10 which corresponds to the informational areas contained within the document currently on platen 28. After imaging, the document is returned to the document tray via a simplex path when either a simplex copy or the first pass of a duplex copy is being made or via a duplex path when a duplex copy is being made.

The electrostatic latent image recorded on photoconductive belt 10 is developed at development station C by a magnetic brush developer unit 34 having three developer rolls 36, 38 and 40. A paddle wheel 42 picks up developer material and delivers it to the developer rolls 36, 38. Developer roll 40 is a cleanup roll while a magnetic roll 44 is provided to remove any carrier granules adhering to belt 10.

Following development, the developed image is transferred at transfer station D to a copy sheet. There, the photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detack the copy sheet from belt 10.

Following transfer, a conveyor 50 advances the copy sheet bearing the transferred image to fusing station E where a fuser assembly, indicated generally by the reference numeral 52 permanently affixes the toner powder image to the copy sheet. Preferably, fuser assembly 52 includes a heated fuser roller 54 and a pressure roller 56 with the powder image on the copy sheet contacting fuser roller 54.

After fusing, the copy sheets are fed through a decurler 58 to remove any curl. Forwarding rollers 60 then advance the sheet via duplex turn roll 62 to gate 64 which guides the sheet to either finishing station F or to duplex tray 66, the latter providing an intermediate or buffer storage for those sheets that have been printed on one side and on which an image will be subsequently printed on the second, opposed side thereof. The sheets are stacked in duplex tray 66 face down on top of one another in the order in which they are copied.

To complete duplex copying, the simplex sheets in tray 66 are fed, in seriatim, by bottom feeder 68 back to transfer station D via conveyor 70 and rollers 72 for transfer of the second toner powder image to the opposed sides of the copy sheets. The duplex sheet is then fed through the same path as the simplex sheet to be advanced to finishing station F.

Copy sheets are supplied from a secondary tray 74 by sheet feeder 76 or from the auxiliary tray 78 by sheet feeder 80. Sheet feeders 76, 80 are friction retard feeders utilizing a feed belt and take-away rolls to advance successive copy sheets to transport 70 which advances the sheets to rolls 72 and then to transfer station D.

A high capacity feeder 82 is the primary source of copy sheets. Tray 84 of feeder 82, which is supported on an elevator 86 for up and down movement, has a vacuum feed belt 88 to feed successive uppermost sheets from the stack of sheets in tray 84 to a take away drive roll 90 and idler rolls 92. Rolls 90, 92 guide the sheet onto transport 93 which in cooperation with idler roll 95 and rolls 72 move the sheet to transfer station station D.

After transfer station D, photoconductive belt 10 passes beneath corona generating device 94 which charges any residual toner particles remaining on belt 10 to the proper polarity. Thereafter, a pre-charge erase lamp (not shown), located inside photoconductive belt 10, discharges the photoconductive belt in preparation for the next charging cycle. Residual particles are removed from belt 10 at cleaning station G by an electrically biased cleaner brush 96 and two de-toning rolls 98 and 100.

The various functions of machine 5 are regulated by a controller 114 which preferably comprises one or more programmable microprocessors. The controller provides a comparison count of the copy sheets, the number of documents being recirculated, the number of copy sheets selected by the operator, time delays, jam corrections, etc.. As will appear, programming and operating control over machine 5 is accomplished through a U.I. 213. Operating and control information, job programming instructions, etc. are stored in a suitable memory 115 which includes both ROM and RAM memory types, the latter being also used to retain jobs programmed through U.I. (User Interface) 213. And while a single memory is illustrated, it is understood that memory 115 may comprise a series of discrete memories. Conventional sheet path sensors or switches may be utilized to keep track of the position of the documents and the copy sheets. In addition, the controller regulates the various positions of the gates depending upon the mode of operation selected.

Figure 4:
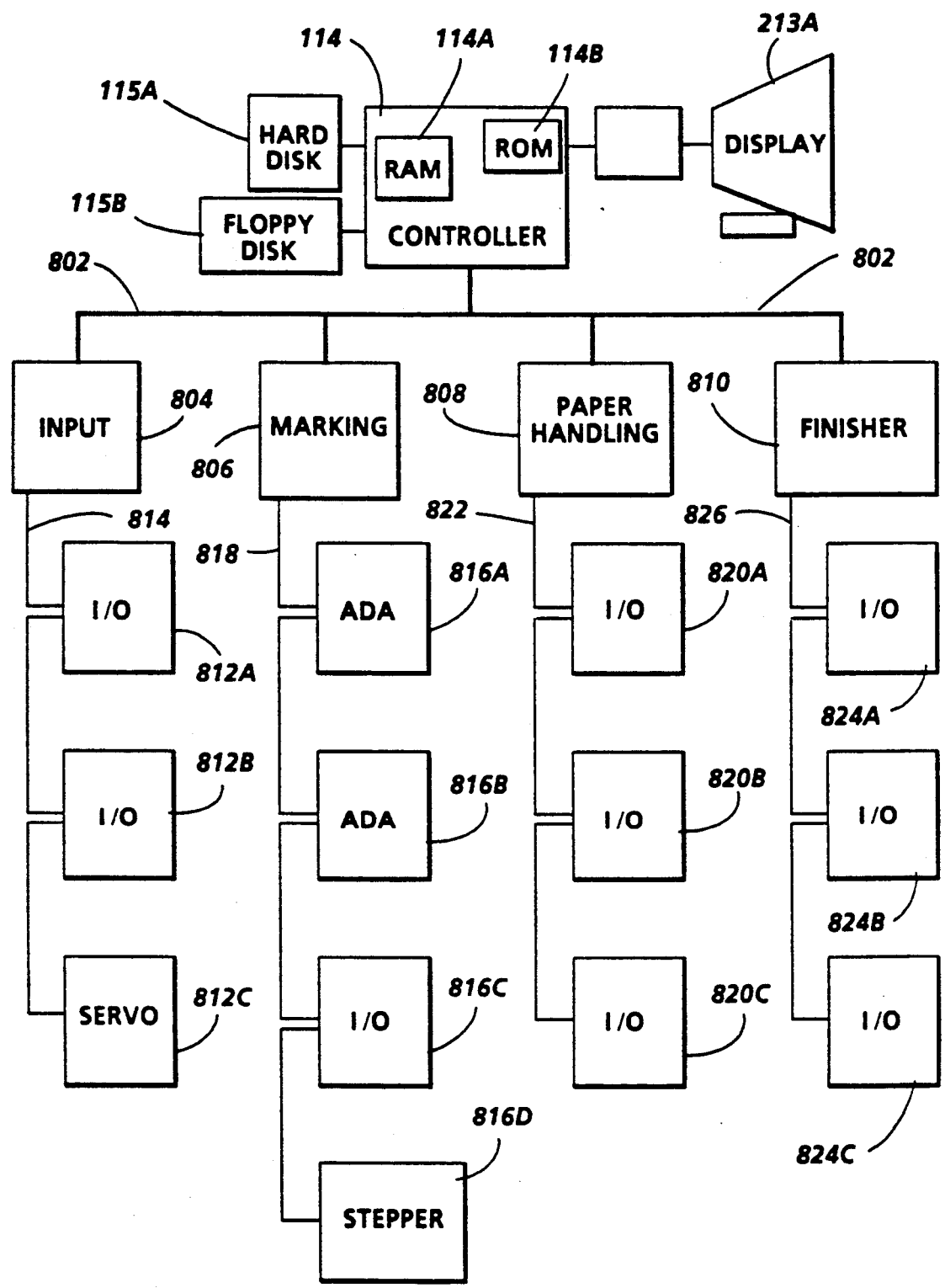
FIG. 4 is a more detailed block diagram of the operating control system of FIG. 3.

With reference to FIG. 4, memory 115 includes a hard or rigid disk drive 115A and a floppy disk drive 115B connected to Controller 114. In a preferred embodiment, the rigid disks are two platter, four head disks with a formatted storage capacity of approximately 20 megabytes. The floppy disks are 3.5 inch, dual sided micro disks with a formatted storage capacity of approximately 720 kilobytes. Preferably, all of the control code and screen display information for the machine is loaded from the rigid disk at machine power up. Changing the data that gets loaded into the machine for execution can be done by exchanging the rigid disk in the machine 5 for another rigid disk with a different version of data or by modifying the contents of the current rigid disk by transferring data from one or more floppy disks onto the rigid disk using the floppy disk drive built into the machine 5. Suitable display 213A of U.I. 213 is also connected to Controller 114 as well as a shared line system bus 302.

The shared line system bus 302 interconnects a plurality of core printed wiring boards including an input station board 304, a marking imaging board 306, a paper handling board 308, and a finisher/binder board 310. Each of the core printed wiring boards is connected to local input/output devices through a local bus. For example, the input station board 304 is connected to digital input/output boards 312A and 312B and servo board 312C via local bus 314. The marking imaging board 306 is connected to analog/digital/analog boards 316A, 316B, digital input/output board 316C, and stepper control board 316D through local bus 318. In a similar manner, the paper handling board 308 connects digital input/output boards 320A, B and C to local bus 322, and finisher/binder board 310 connects digital input/output boards 324A, B and C to local bus 326.

Figure 5:
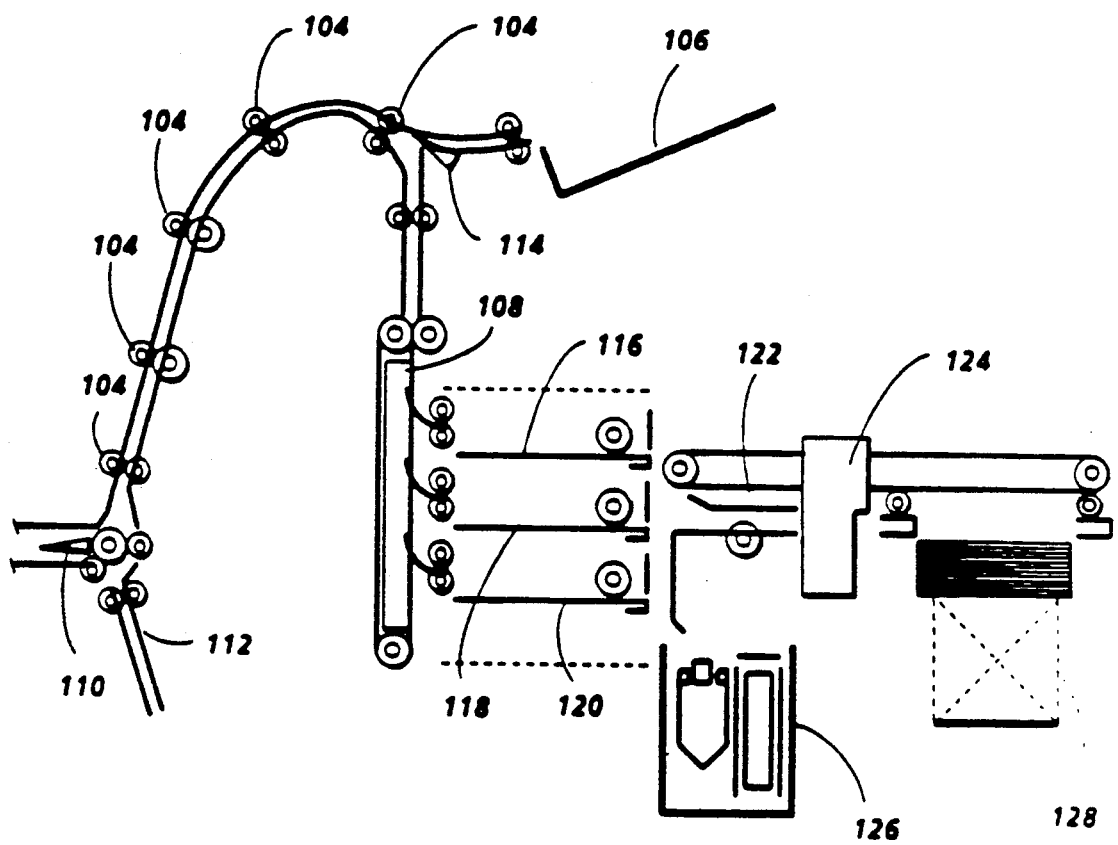
FIG. 5 is a schematic elevational view showing the finishing sub-system of the machine shown in FIG. 1.

Referring now to FIG. 5, finishing station F receives fused copies from rolls 102 (FIG. 2) and delivers them to gate 110. Gate 110 diverts the copy sheet to either registration rolls 104 or inverter 112. Copy sheets diverted to rolls 104 are advanced to gate 114 which diverts the sheets to either the top tray 106 or to vertical transport 108. Transport 108 transports sheets to any one of three bins 116, 118 or 120 which are used to compile and register sheets into sets. The bins are driven up or down by a bidirectional motor adapted to position the proper bin at the unloading position where a set transport 122 having a pair of set clamps is used to grasp and transport sets from the bins to either sheet stapling apparatus 124 when it is desired to staple the sets, or to binder 126 when it is desired to bind the sets, or to stacker 128 when unfinished sets are desired.

Figure 6:
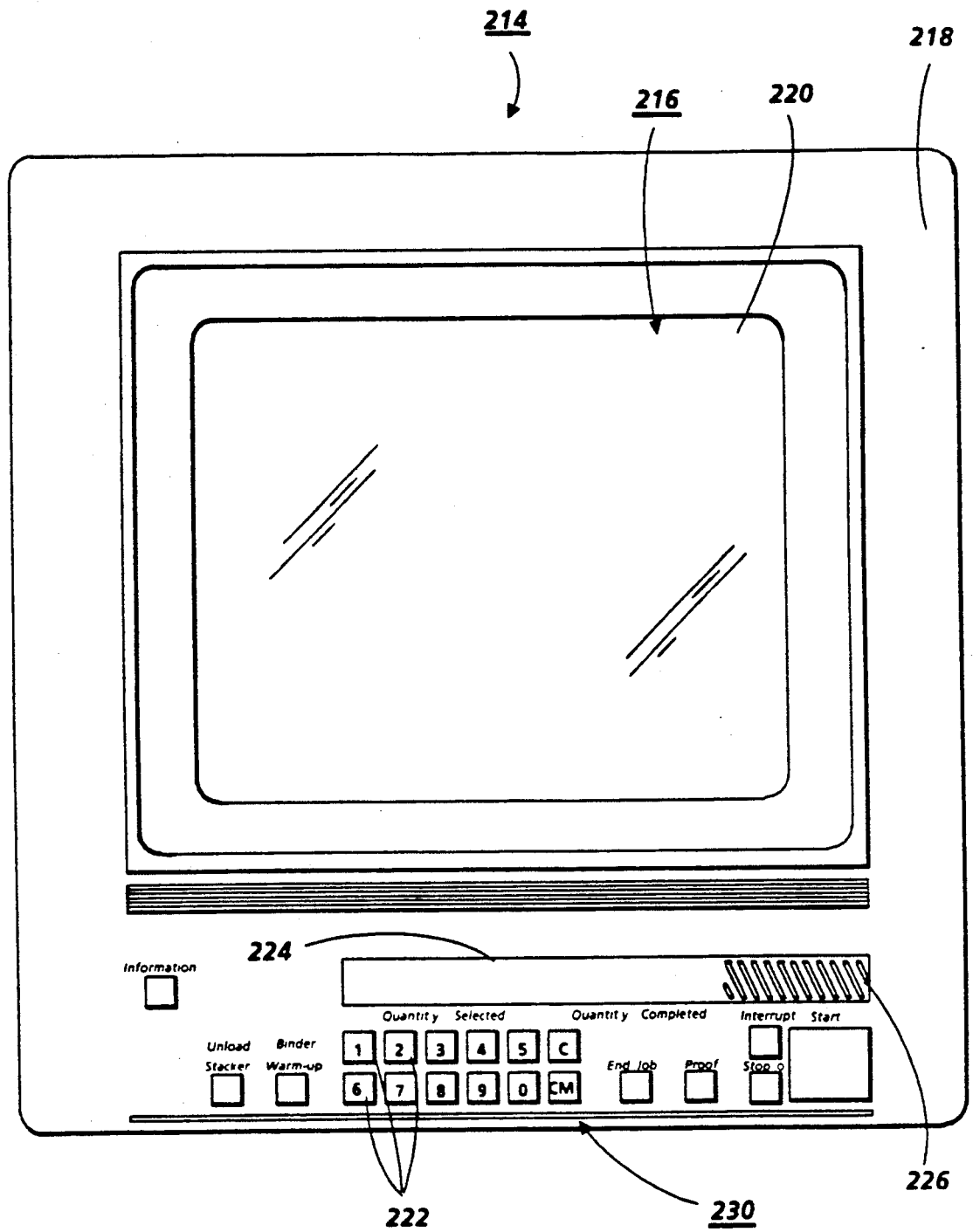
FIG. 6 is a front view of the U.I. color touch monitor showing the soft button display screen and hard button control panel.

Referring to FIG. 6, there is shown the color touch monitor 214 for the touch dialogue U.I. 213 of the present invention. As will appear, monitor 214 provides an operator user interface with hard and soft touch control buttons enabling communication between operator and machine 10. Monitor 214 comprises a suitable color cathode ray tube 216 of desired size and type having a peripheral framework forming a decorative bezel 218 thereabout. Bezel 218 frames a rectangular video display screen 220 on which soft touch buttons in the form of icons or pictograms (seen for example in FIG. 17) and messages are displayed as will appear together with a series of hard control buttons 222 and 10 seven segment displays 224 therebelow. Displays 224 provide a display for copy "Quantity Selected", copy "Quantity Completed", and an area 226 for other information.

Hard control buttons 222 comprise "0-9" buttons providing a keypad 230 for programming copy quantity, code numbers, etc.; a clear button "C" to reset display 224; a "Start" button to initiate print; a clear memory button "CM" to reset all dialogue mode features to default and place a "1" in the least significant digit of display 224; an "Unload Stacker" button requesting transfer of the contents of stacker 128; a "Stop" button to initiate an orderly shutdown of machine 5; a "Binder Warm-up" button to initiate warm-up of binder 126; an "Interrupt" button to initiate a job interrupt; a "Proof" button to initiate making of a proof copy; an "End Job" button to end the current job; and an "i" button to initiate a request for information.

Figure 7:
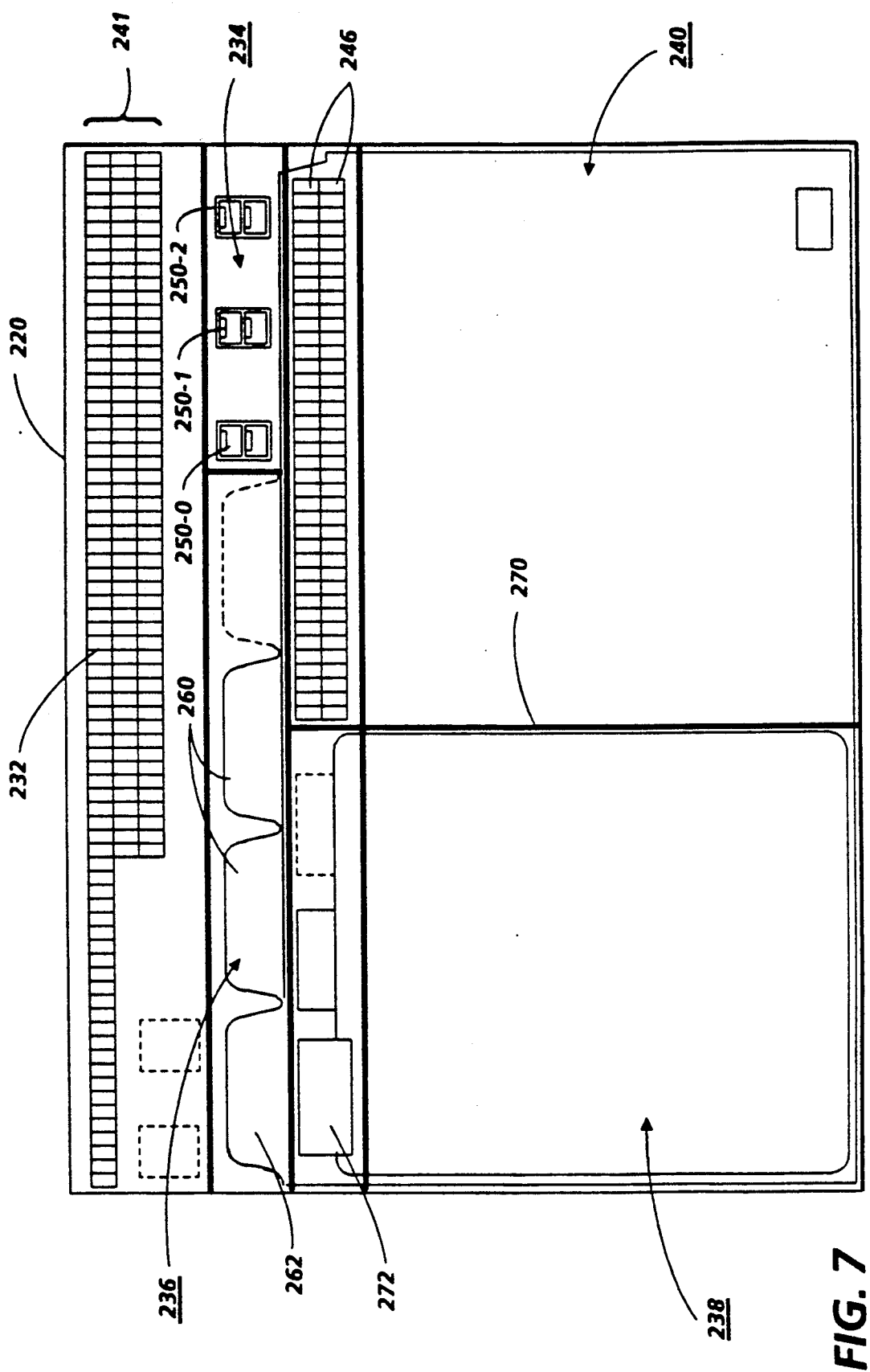
FIG. 7 is a front view of the touch monitor screen with the principal elements of the soft touch dialogue displayed.

Referring now to FIG. 7, for dialogue purposes, screen 220 of monitor 214 is separated into five basic display areas, identified as a message area 232, a dialogue mode selection area 234, a dialogue pathway selection area 236, a scorecard selection area 238, and a work selection area 240.

Message area 232 consists of 3 lines 241 located at the top of screen 220. In addition, two programming conflict message lines 246 are provided in work selection area 240. The dialogue mode selection area 234 comprises an active area containing certain top level dialogue mode controls available to the operator. The mode controls are soft touch buttons 250-0, 250-1, and 250-2 in the form of icons representing file cabinets located on the right side of the screen 220 directly below message area 232.

The dialogue pathway selection area 236 and the scorecard selection area 238 basically simulate a card within a card filing system with primary dialogue pathway file folders 260 and secondary file cards, the latter being referred to as scorecards 270. As will appear, scorecards 270 provide additional programming pathway options. File folders 260 and scorecards 270 are arranged in overlaying relation one in front of the other. The dialogue pathway file folders 260, which are located beneath message area 232 and which extend up into the dialogue mode area 234, each have an outwardly projecting touch tab 262 along the top edge identifying the dialogue pathway represented by the folder, as for example STANDARD, FANFOLD, OVERSIZED, etc. (see FIG. 17 for example). To allow the file folders 260 to be distinguished from one another without the need to reshuffle the folders each time it is desired to display a folder hidden behind the folder currently displayed, each tab 262 is offset from the other so that tabs 262 are always visible whatever folder is displayed.

Figure 17:
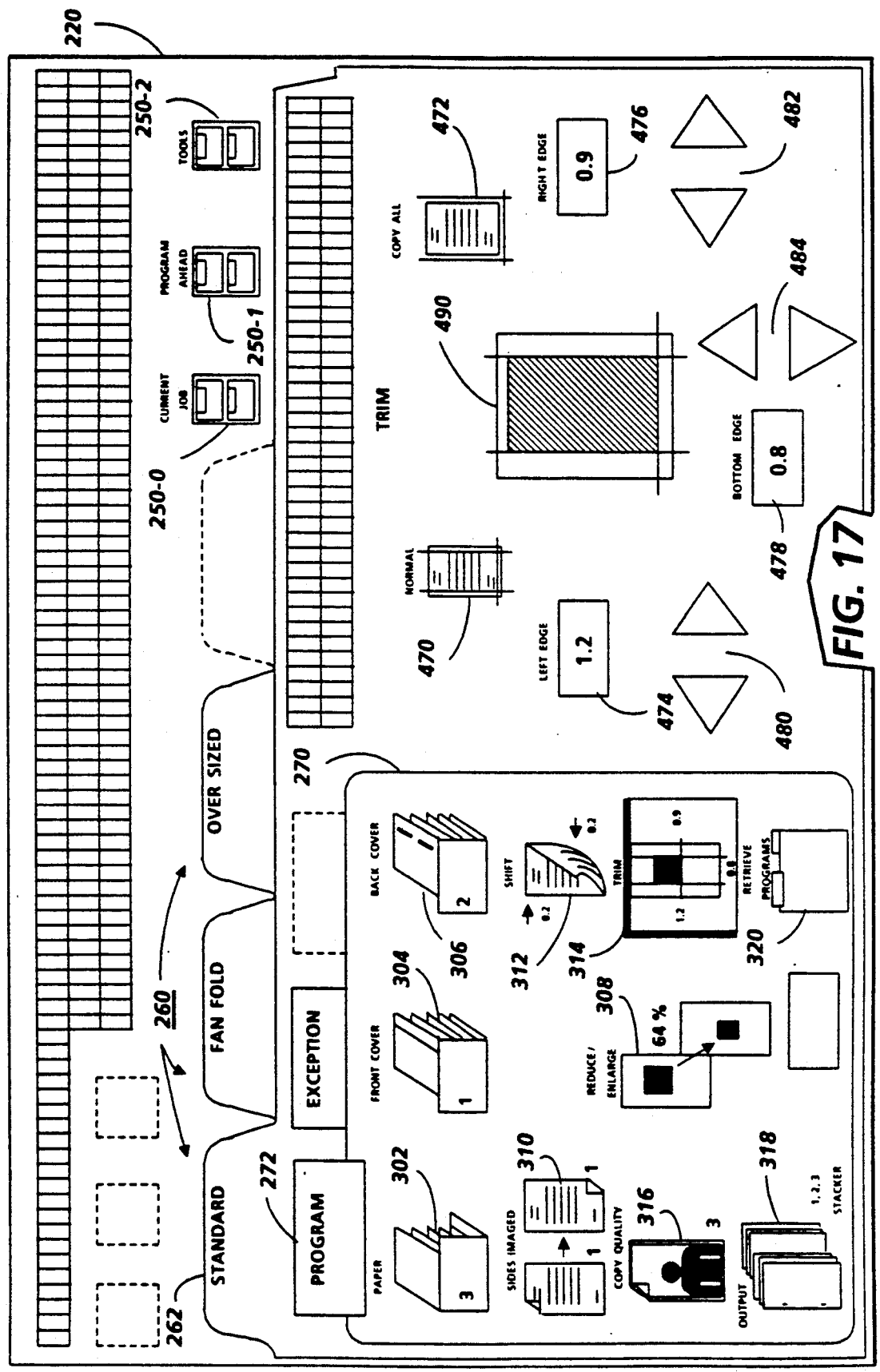
FIG. 17 is a front view of the touch monitor screen shown in FIG. 10 depicting the touch selection icons that are displayed in the work area as a result of touch selection of the TRIM icon on the PROGRAM scorecard.

Scorecard selection area 238 appears in the lower left corner of screen 220 beneath dialogue selection area 234 and extends to the border of work selection area 240. Scorecard selection area 238 contains a file of scorecards 270 which present the features (first level program selections) available with each of the dialogue pathway file folders 260. As seen in FIG. 17 for example, area 238 displays the features (first level program selections) resident with the currently selected scorecard, such selections remaining at previously selected options until either timeout or the "CM" button (FIG. 5) is pressed. Two or three scorecards 270 are typically provided, depending on the dialogue pathway file folder 260 selected. Scorecards 270 each comprise a relatively small file card arranged in overlaying relation to one another so as to simulate a second but smaller card file. Each scorecard 270 has a touch tab 272 displaying the programming pathway options available with the scorecard, such as PROGRAM, EXCEPTION, etc.. Scorecard tabs 272 are offset from one another to enable the identity of each scorecard to be determined whatever its position in the scorecard file. Additionally, scorecard tabs 272 are shaped different than the dialogue pathway file folder tabs 262 to prevent confusion.

Figure 18:
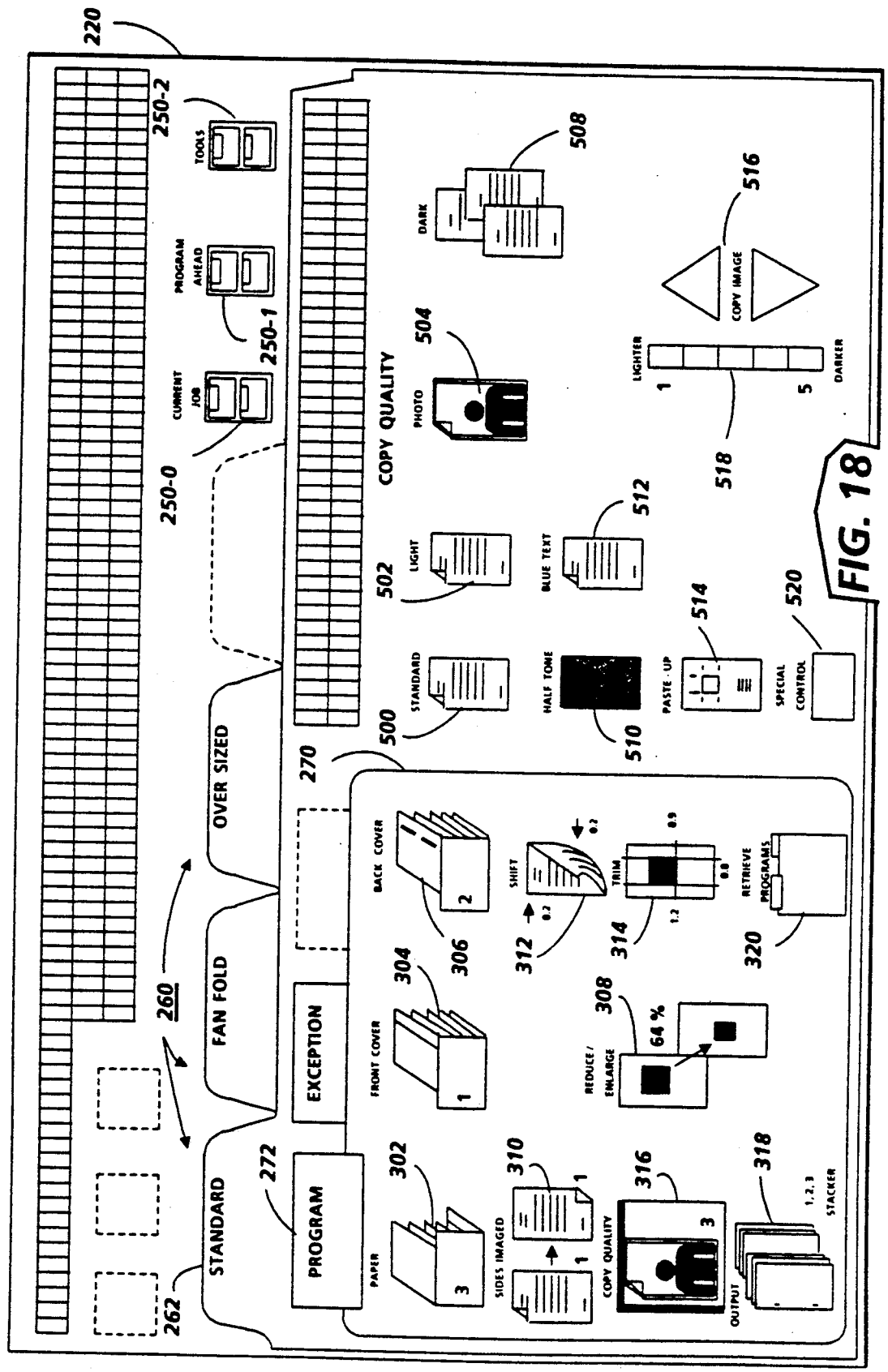
FIG. 18 is a front view of the touch monitor screen shown in FIG. 10 depicting the touch selection icons that are displayed in the work area as a result of touch selection of the COPY QUALITY icon on the PROGRAM scorecard.
Figure 19:
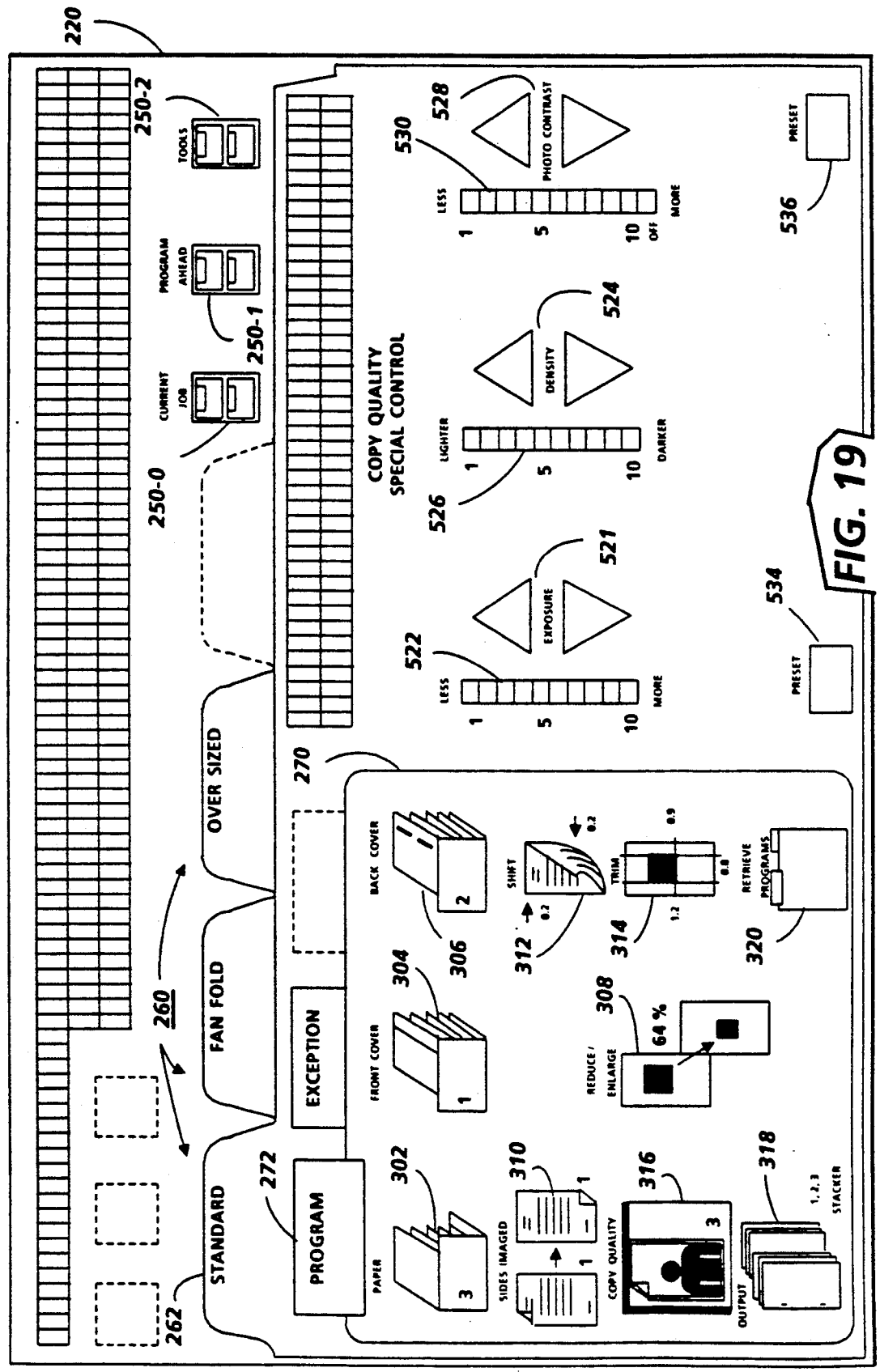
FIG. 19 is a front view of the touch monitor screen depicting the touch selection icons that are displayed in the work area as a result of touch selection of the SPECIAL CONTROL icon shown in FIG. 18.
Figure 20:
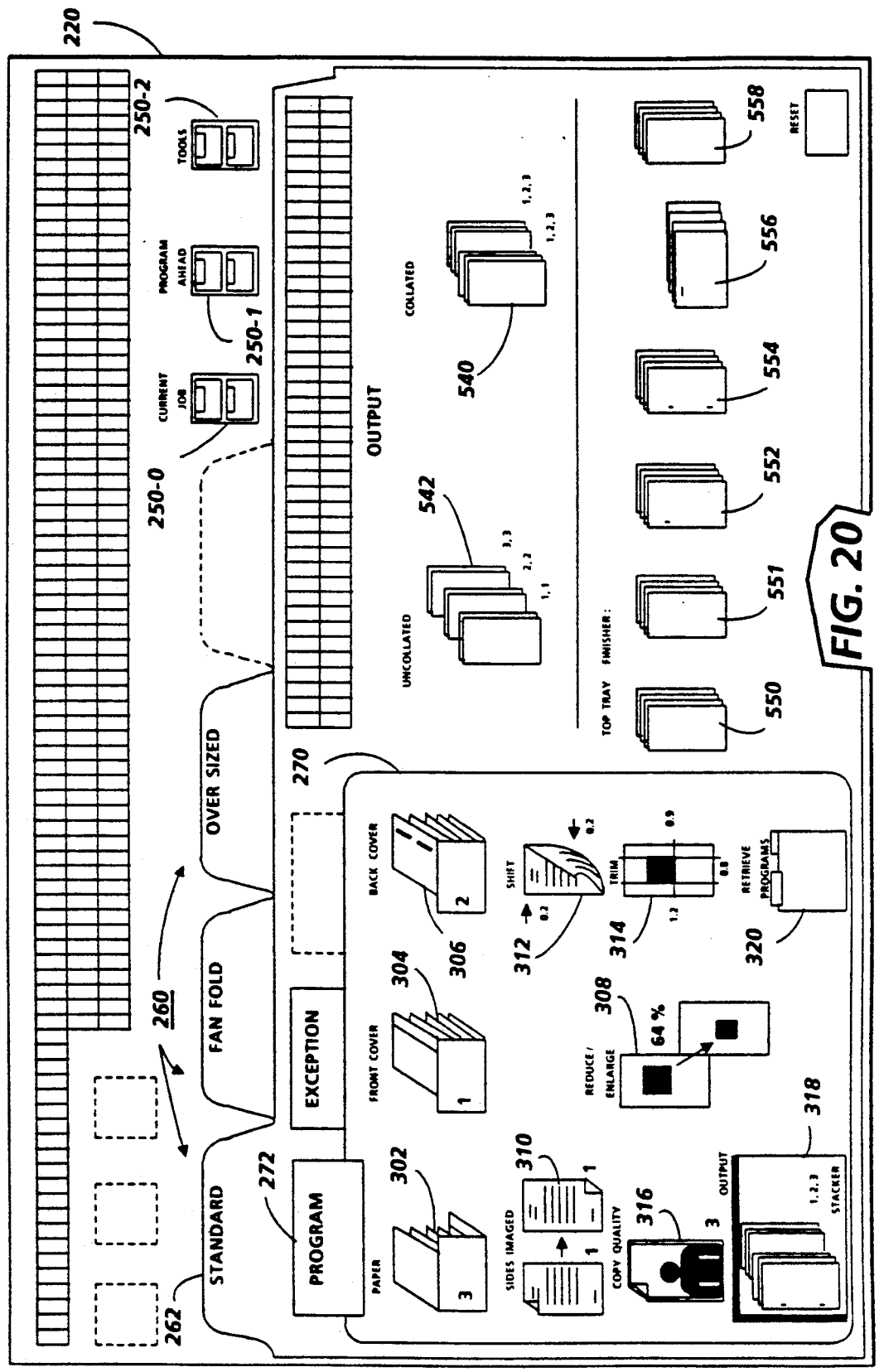
FIG. 20 is a front view of the touch monitor screen shown in FIG. 10 depicting the touch selection icons that are displayed in the work area as a result of touch selection of the OUTPUT icon on the PROGRAM scorecard.
Figure 21:
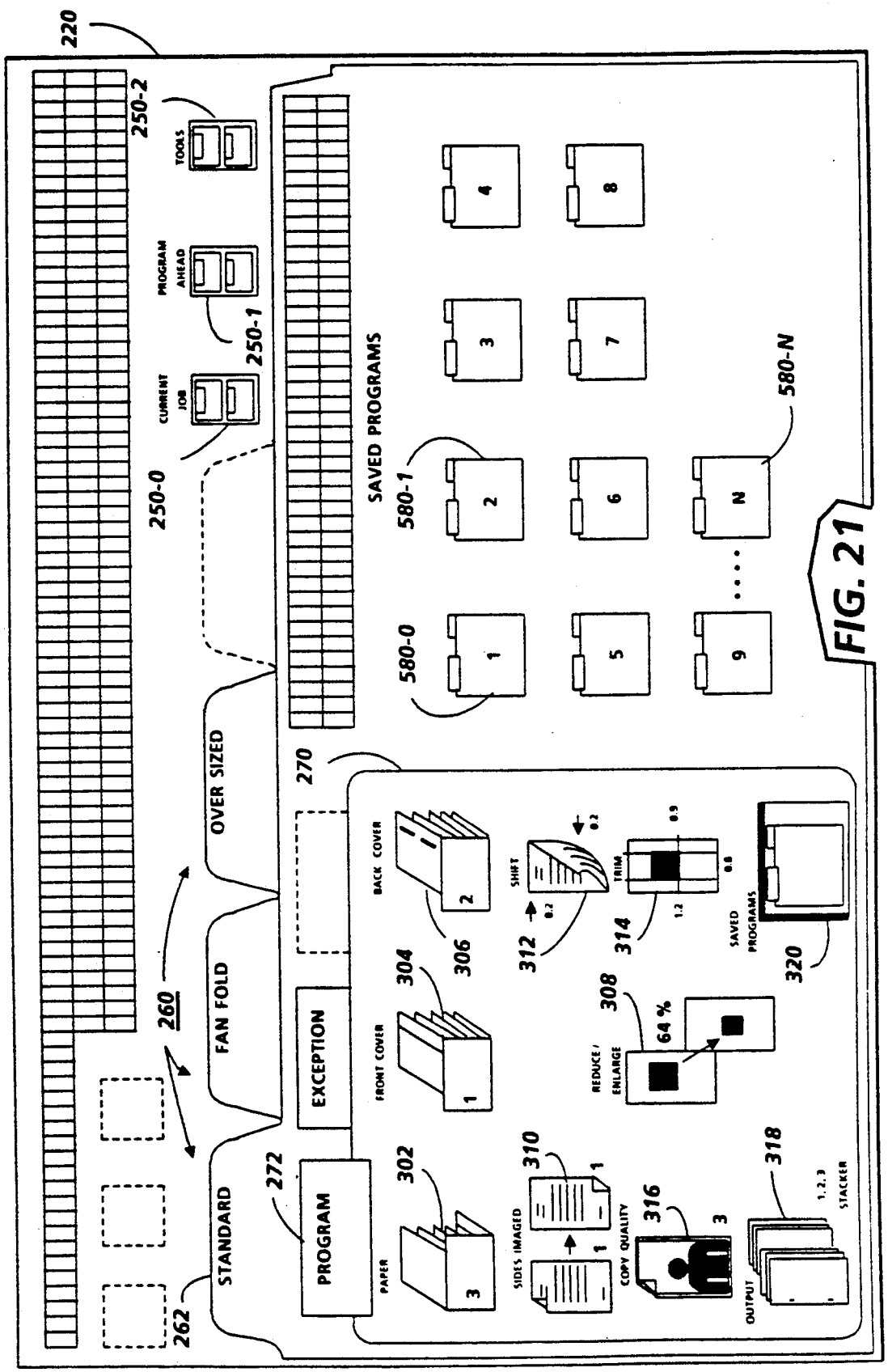
FIG. 21 is a front view of the touch monitor screen shown in FIG. 10 depicting the touch selection icons that are displayed in the work area as a result of touch selection of the RETRIEVE PROGRAMS icon on the PROGRAM scorecard.

Work selection area 240 appears in the lower right portion of screen 220, area 240 being beneath the dialogue pathway area 236 and extending from the edge of scorecard selection area 238 to the right side of screen 220. The top two lines 246 of the work selection area 240 are reserved for programming conflicts and prompts with the remaining area used for displaying the feature options (second level program selections) available with the first level program selection that is touched on the scorecard currently selected, an example of which is seen in FIG. 18. As will appear, the operator can scan and make a selection within the work area or pick another scorecard item.

Figure 8:
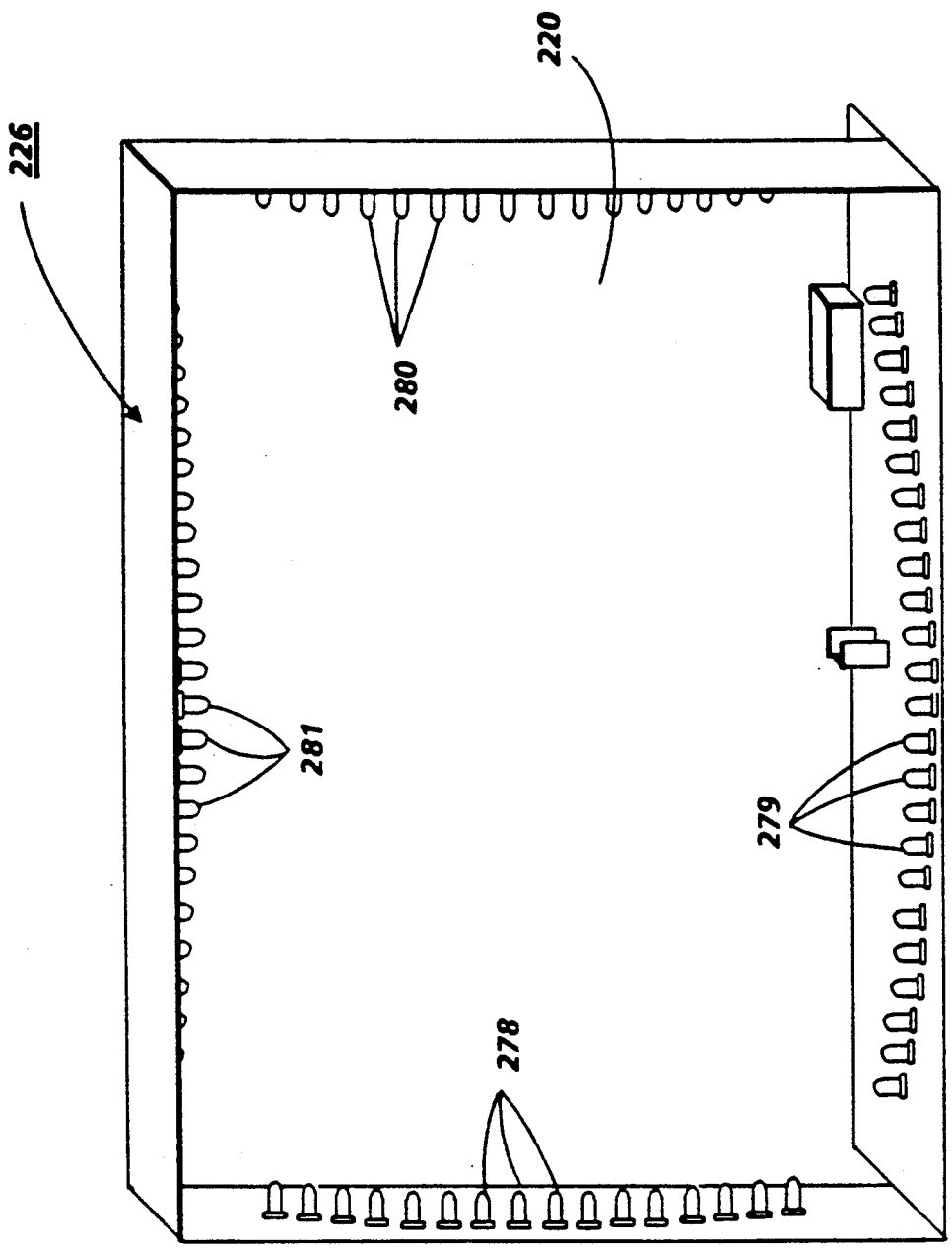
FIG. 8 is an isometric view showing the touch control LED and photodiode pwb's bordering the monitor screen.

Referring particularly to FIG. 8, mounted around the periphery of display screen 220 behind bezel 218 is a touch input system 226 which provides a pattern of invisible interruptable beams across the face of the screen 220 using light emitting diodes (LEDs) and photodetectors (PDs). In the example shown, two rows of LEDs 278, 279 are provided on separate Printed Wiring Boards (PWBs) along two adjoining sides of display screen 220. Two corresponding rows of PDs 280, 281 are provided on PWBs positioned on the remaining two sides of the display screen 220, the number of PDs 280, 281 being equal in number to and in opposed relationship to LEDs 278, 279. LEDs 278, 279 emit infrared rays which extend in generally parallel fashion across the face of the display screen 220 to the PDs 280, 281 opposite thereto.

LEDs 278, 279 and PDs 280, 281 cooperate to establish an X-Y coordinate system of invisible beams or rays across the face of the display screen 220 so that, when an operator touches a particular location on the screen 220, one or more of the beams are interrupted. Suitable control logic such as shown in U.S. Pat. No. 4,267,443 to Carroll et al. determines the average X and Y locations of the beams that are broken to identify the particular location on screen 220 touched by the operator.

While a specific touch input system 226 has been shown and described, other touch systems which are capable of providing an output signal indicating an area touched on a display screen may be envisioned.

In order for the soft touch buttons (i.e., icons) on screen 220 to provide information regarding both their current selection state and their current status, a display convention is provided that will allow the operator to quickly scan the display and determine current feature selections. Referring to Table I, unselected features that are selectable are indicated by an outlined icon with a shadowed background while selected features that are selectable are indicated by a colorfilled icon with a shadowed background. Unselected features that are not selectable are indicated by an outlined icon without a shadowed background while selected features that are not selectable are indicated by a colorfilled icon without a shadowed background.

TABLE I

| SELECTABLE | | NOT SELECTABLE |
|---|---|---|
| SELECTD | COLORFILLED SHADOW | COLORFILLED NO SHADOW |
| UNSELECTD | OUTLINED SHADOW | OUTLINED NO SHADOW |

In cases where an unselected feature that is not selectable is touched, a message will be displayed in the programming conflict area 246 of screen 220.

Figure 9:
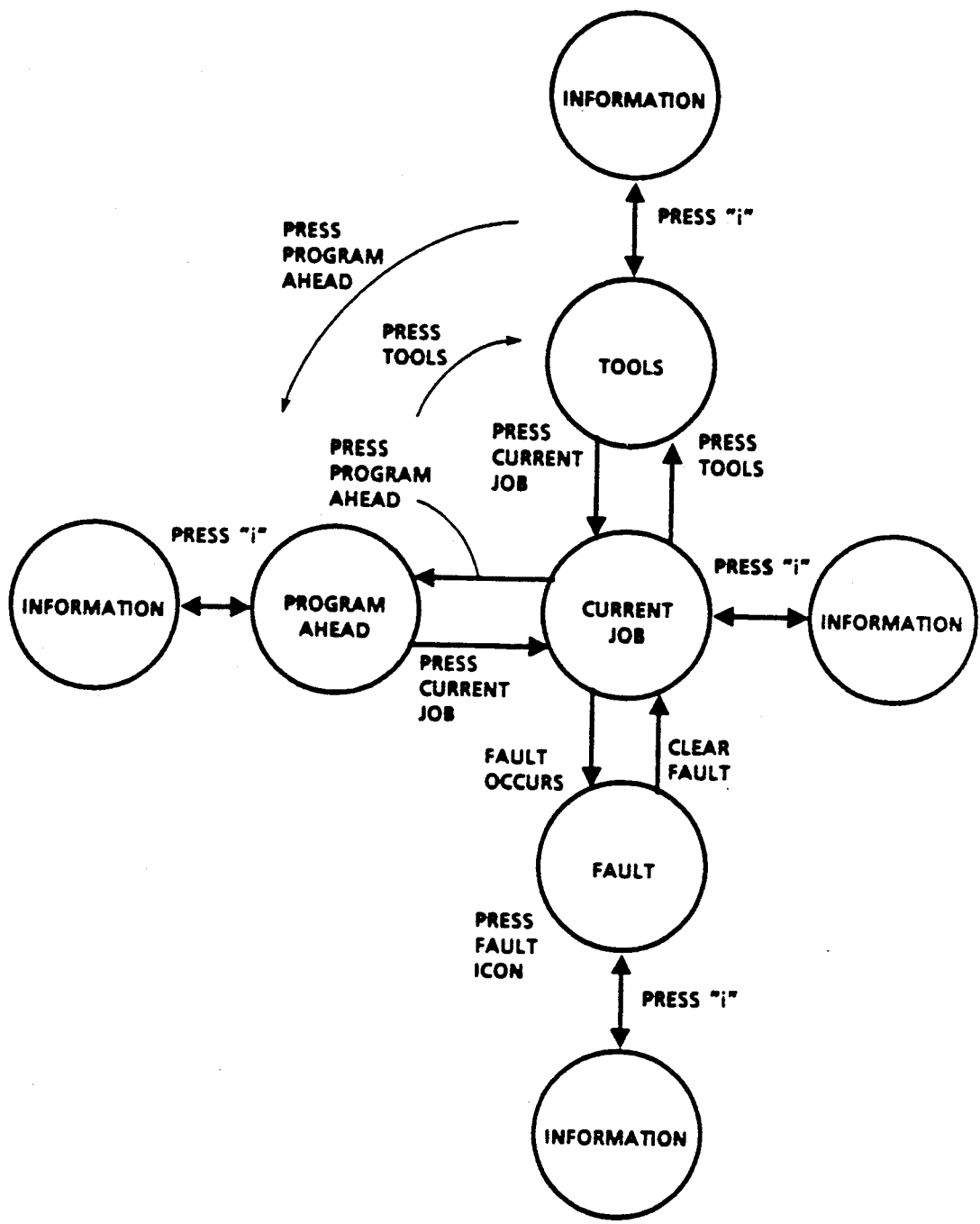
FIG. 9 is a flow chart depicting the U.I. operating states.

Referring particularly to FIG. 9, if the operator enters the region of a selectable icon, but drags his finger outside the region, the icon within the region will be SELECTED. If the operator enters the region of another selectable icon, a tone will again be emitted and the icon will change. Withdrawing the finger will now cause the new selection to be accepted and the icon will change again to indicate the selection as described above.

If the operator touches the region of a selectable icon and then moves outside the region and withdraws his finger, the selection will be accepted. If a normally active region is rendered inactive, a message will temporarily appear when the region is entered.

Figure 16:
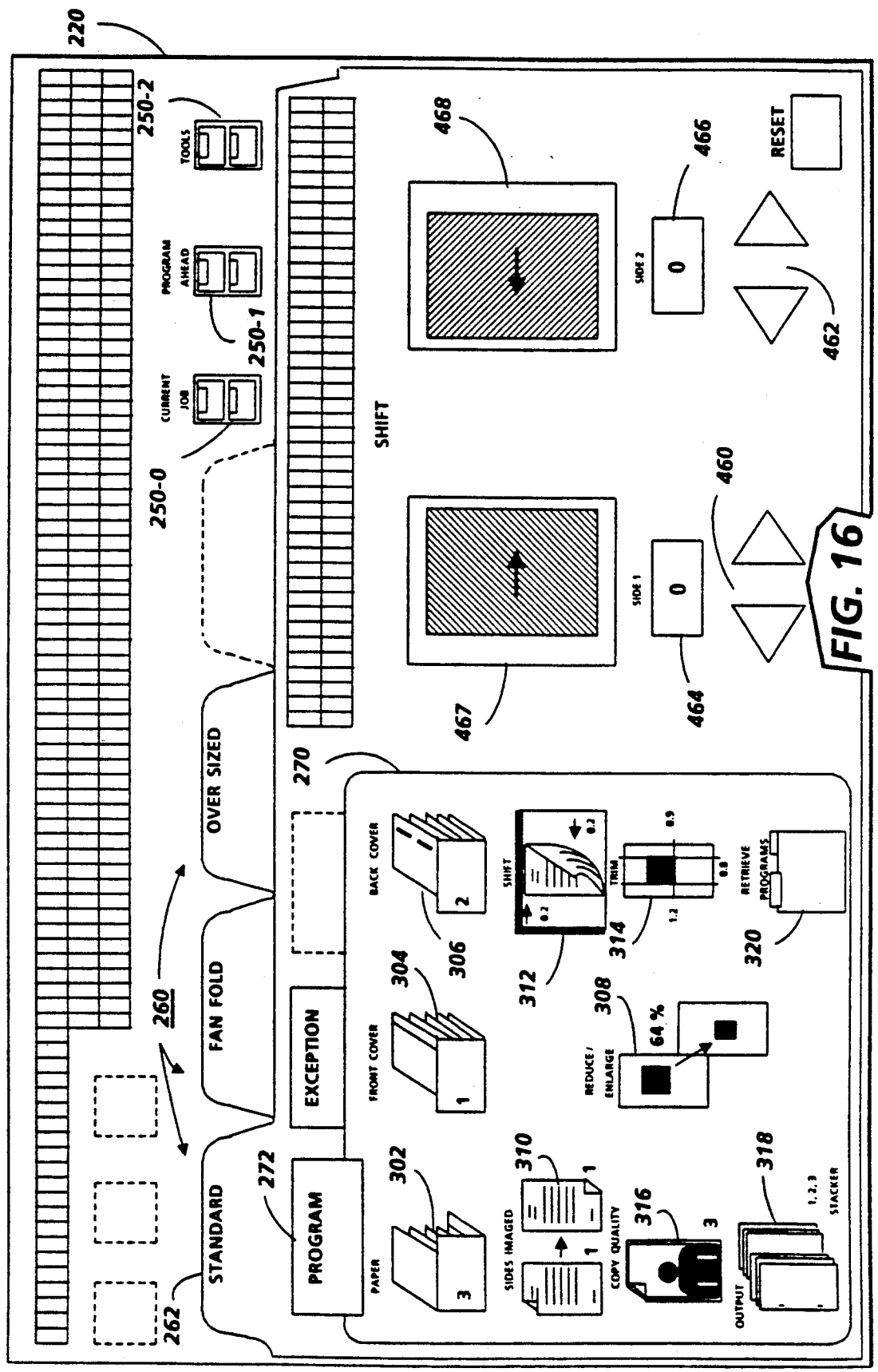
FIG. 16 is a front view of the touch monitor screen shown in FIG. 10 depicting the touch selection icons that are displayed in the work area as a result of touch selection of the SHIFT icon on the PROGRAM scorecard.

Referring particularly to FIG. 16, the five operating states for U.I. 213 consist of (1) CURRENT JOB, (2) PROGRAM AHEAD (3) TOOLS, (4) FAULTS, and (5) INFORMATION. The solid line arrows of FIG. 16 define the acceptable paths between the various states. The INFORMATION state is entered by means of the hard control button "i" on bezel 218 while the FAULTS state is in the form of a file card that overlays the file cards currently displayed in the event of a fault. The CURRENT JOB, PROGRAM AHEAD, and TOOLS states are entered by pressing the soft touch buttons 250-0, 250-1 and 250-2 respectively displayed on screen 220 in the Dialogue Mode Selection area 234.

Assume U.I. 213 to be in the CURRENT JOB state as a result of actuation of soft touch button 250-0. The functions of this state are to inform the operator of the daily tasks that are necessary to keep machine 5 in good working order, to allow the operator to program feature selections for the current job, and to allow the operator to run a copying job. The CURRENT JOB state is sub-divided into three cases: (1) "Job Complete", (2) "Print", and (3) "Job Incomplete". "Job Complete" implies that a job is not in progress and has been completed, "Print" refers to a job in progress, and "Job Incomplete" refers to a job in progress that has either voluntarily or involuntarily been stopped or interrupted. "Job Complete" is defaulted to except for the "Print" case.

The CURRENT JOB state can exit to the PROGRAM AHEAD state by touching the PROGRAM AHEAD button 250-1 in any of the "Job Complete", "Job Incomplete" or "Print" cases; or can exit to the INFORMATION state by pressing the "i" hard button on bezel 218; or can exit to the TOOLS state by touching the TOOLS soft touch button 250-2 in either the "Job Complete" or "Job Incomplete" cases. In addition the CURRENT JOB state will automatically enter the FAULT state when a fault occurs.

Figure 10:
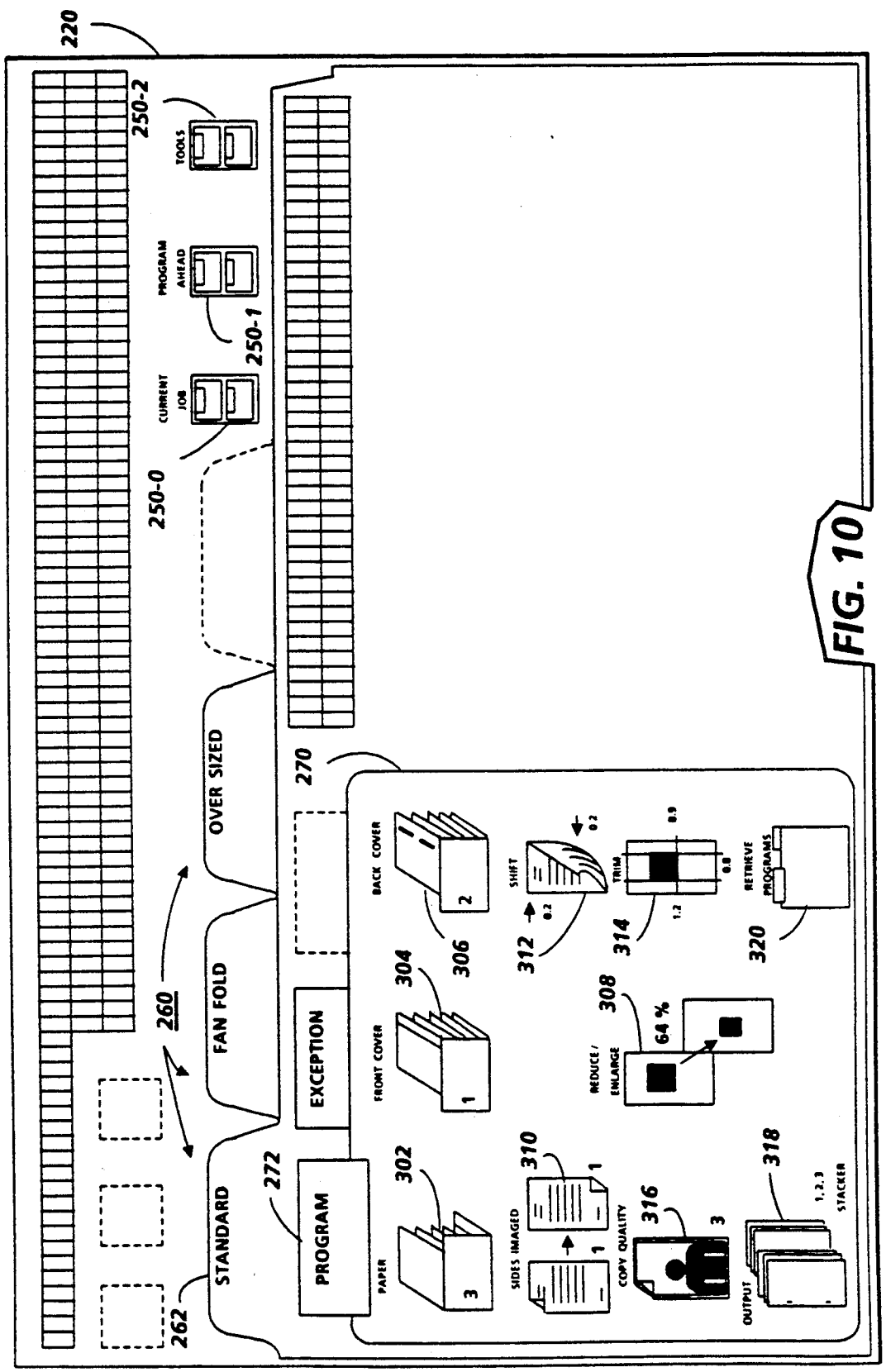
FIG. 10 is a front view depicting the touch monitor screen display in the CURRENT job mode following touch selection of the STANDARD file folder.

When entered in the CURRENT JOB state, the dialogue pathway file folders 260 tabbed STANDARD, OVERSIZED, and FANFOLD are displayed providing various dialogue pathway selections in the form of scorecards 270. The function and the behavior of these tabbed file folders within the dialogue pathway selection area 236 for the "Job Complete", "Job Incomplete", and "Print" cases are as follows:

STANDARD: In the "Job Complete" case, this file folder provides standard programming options. As seen in FIG. 10, the PROGRAM scorecard 270 is displayed with the following icons presented for selection to the operator: PAPER 302, FRONT COVER 304, BACK COVER 306, REDUCE/ENLARGE 308, TRIM 310, SHIFT 312, SIDES IMAGED 314, COPY QUALITY 316, OUTPUT 318, and RETRIEVE PROGRAMS 320. The EXCEPTION scorecard is also available with this file folder. The "Job Incomplete" and "Print" cases are inactive.

Figure 11:
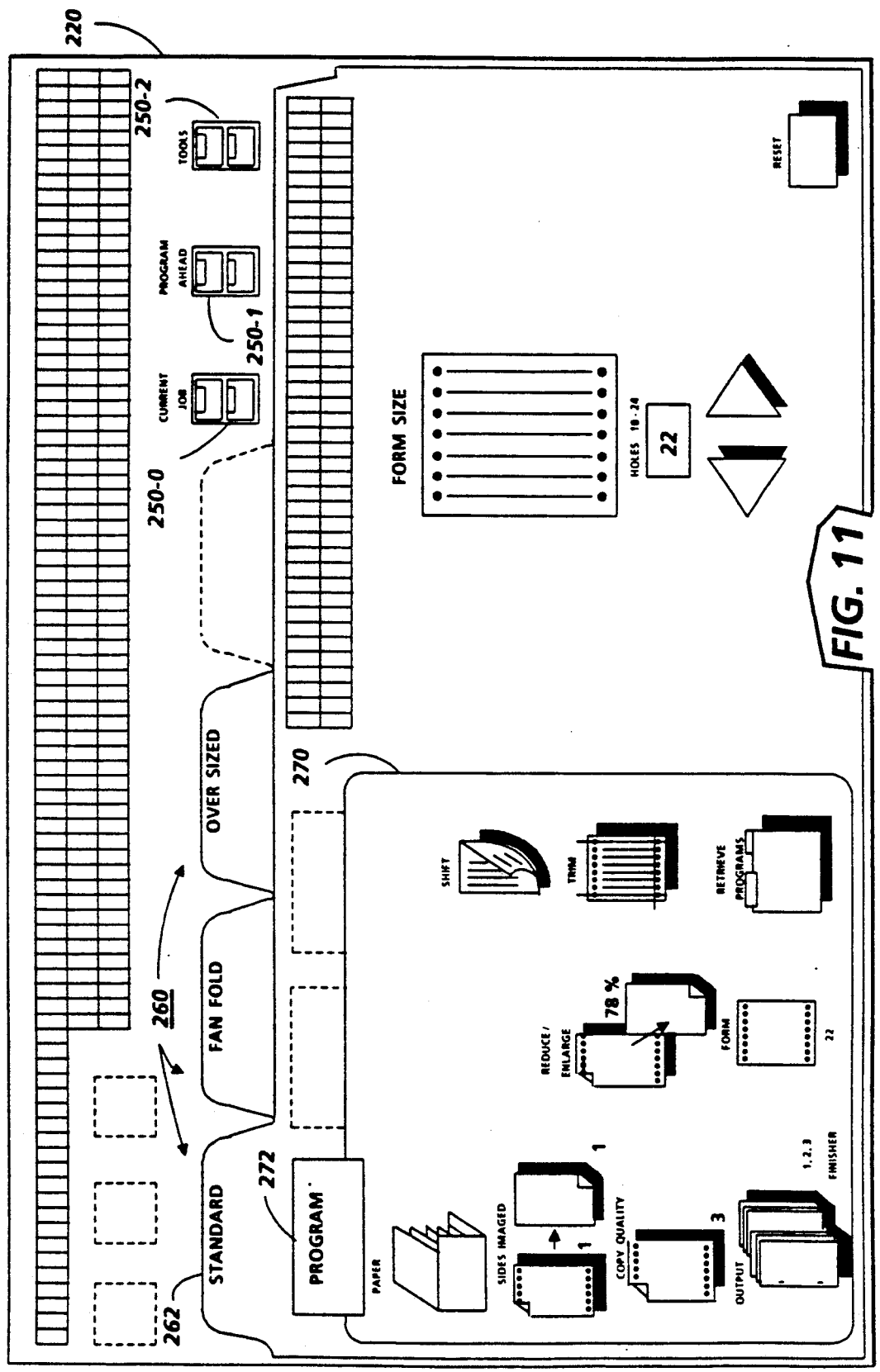
FIG. 11 is a front view depicting the touch monitor screen display in the CURRENT job mode following touch selection of the FANFOLD file folder.

FANFOLD: As seen in FIG. 11, in the "Job Complete" case, this file folder enables Computer Forms Feeding (CFF) input. This folder displays a scorecard tabbed PROGRAM having the following fanfold representing icons for selection by the operator: MAIN PAPER, REDUCE/ENLARGE, TRIM, SHIFT, SIDES IMAGED (1-1, 1-2 only), COPY QUALITY, FORM, OUTPUT, and RETRIEVE PROGRAMS. The "Job Incomplete" and "Print" cases are inactive.

Figure 12:
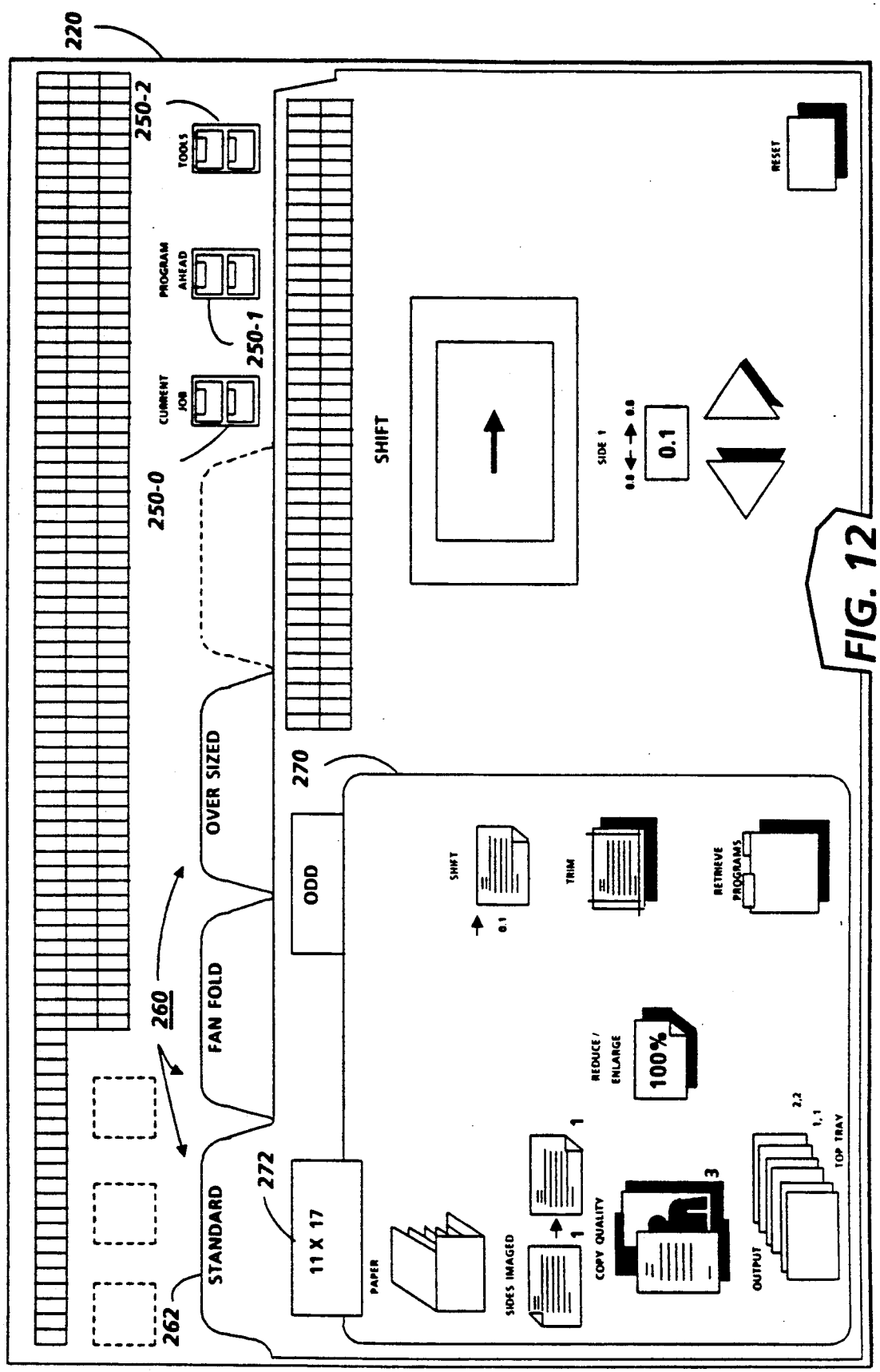
FIG. 12 is a front view depicting the touch monitor screen display in the CURRENT job mode following touch selection of the OVERSIZED file folder.
Figure 13:
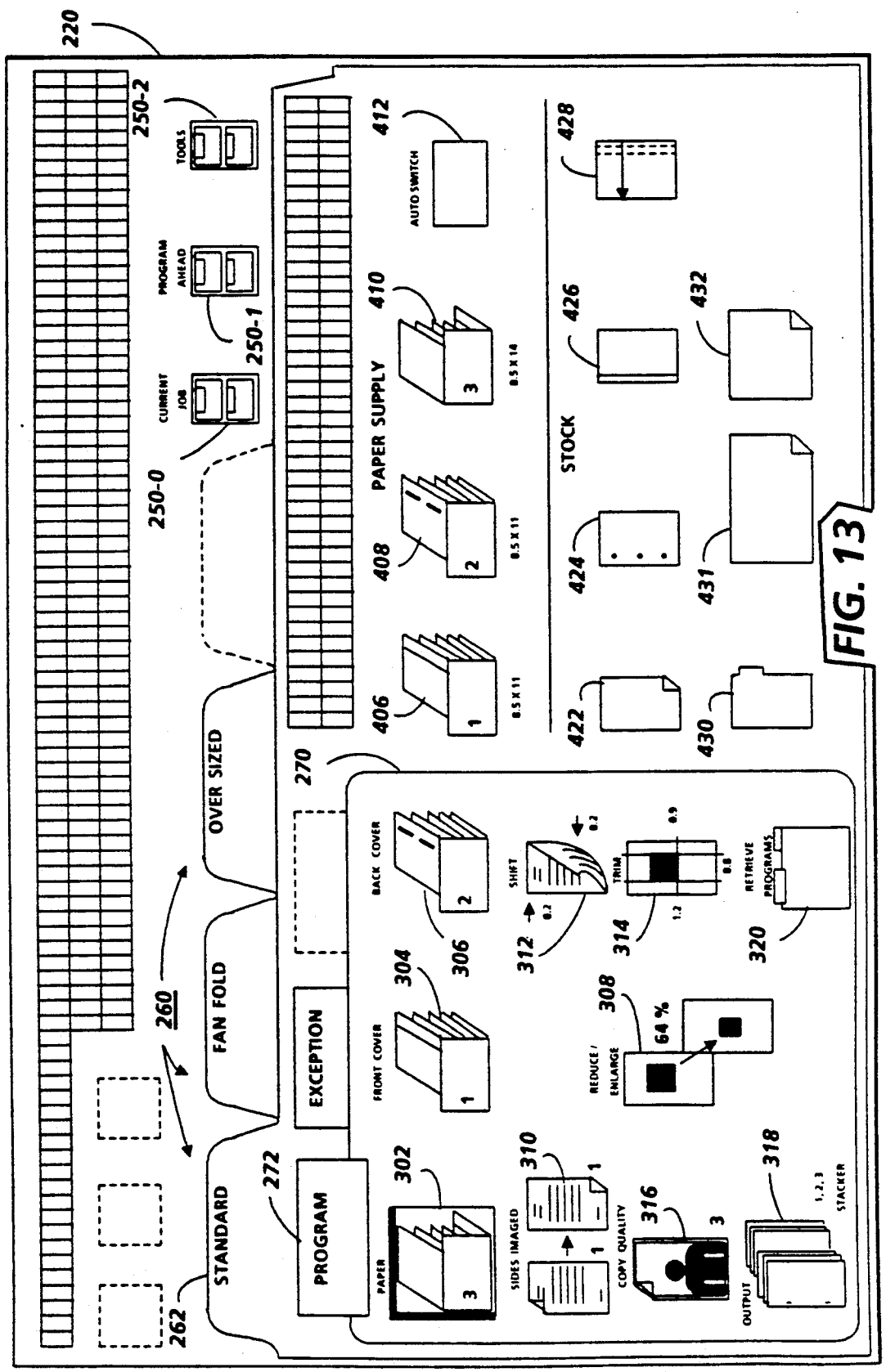
FIG. 13 is a front view of the touch monitor screen shown in FIG. 17 depicting the touch selection icons that are displayed in the work area as a result of touch selection of the PAPER icon on the PROGRAM scorecard.
Figure 14:
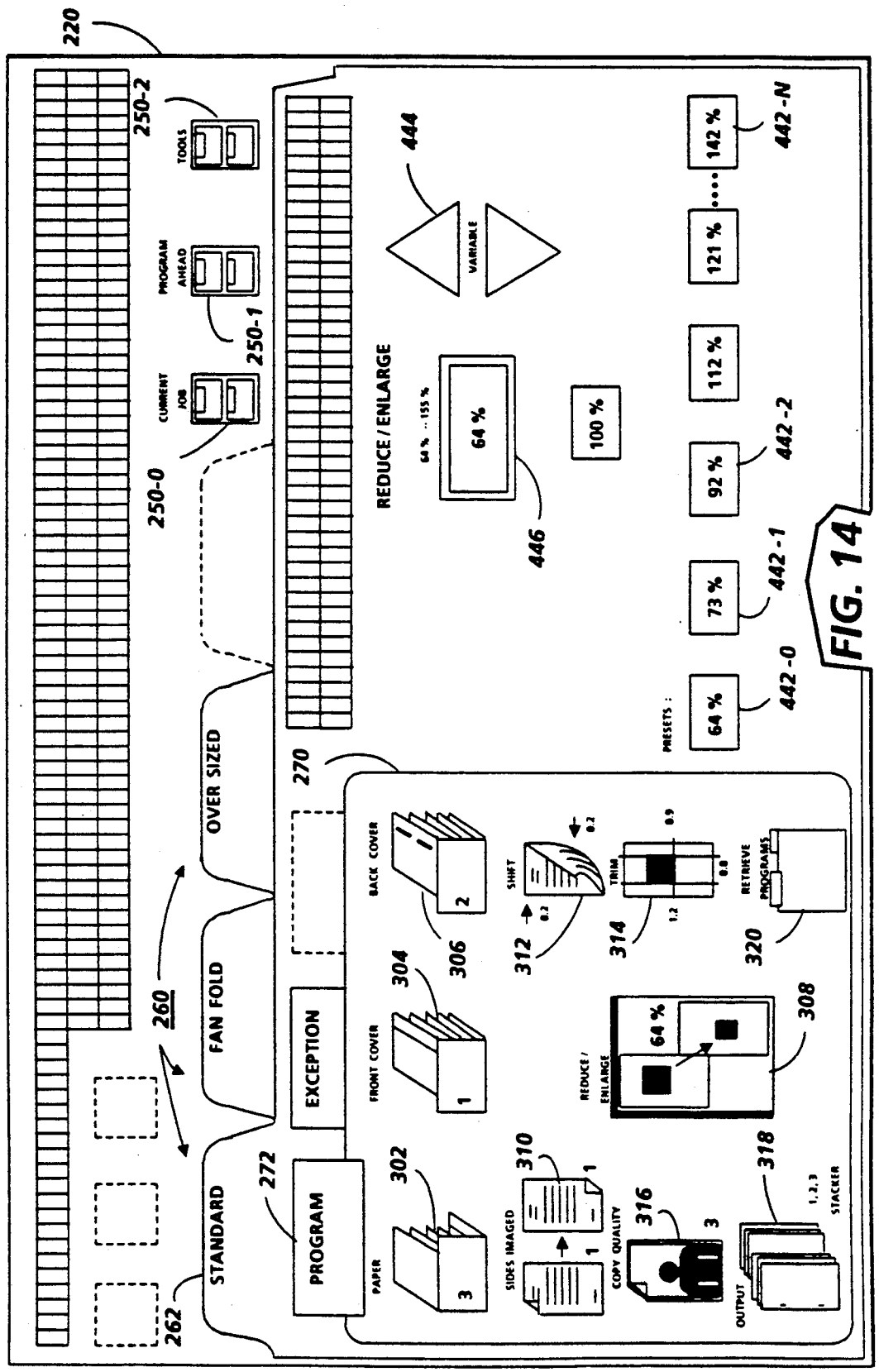
FIG. 14 is a front view of the touch monitor screen shown in FIG. 10 depicting the touch selection icons that are displayed in the work area as a result of touch selection of the REDUCE/ENLARGE icon on the PROGRAM scorecard.
Figure 15:
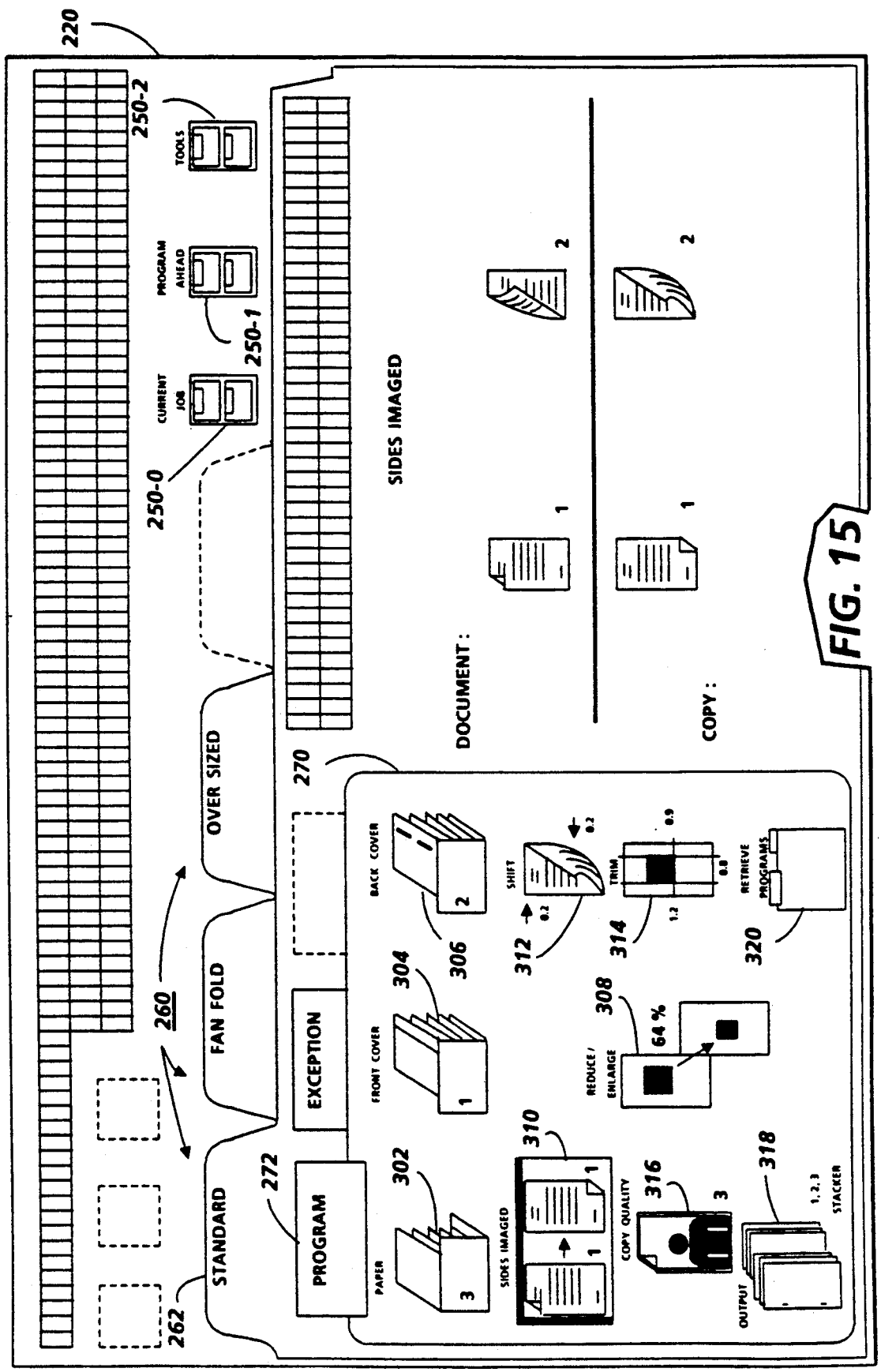
FIG. 15 is a front view of the touch monitor screen shown in FIG. 10 depicting the touch selection icons that are displayed in the work area as a result of touch selection of the SIDES IMAGED icon on the PROGRAM scorecard.

OVERSIZED: As seen in FIG. 12, in the "Job Complete" case, this file folder enables a special 3-pitch operating mode for copies exceeding 9 inches in width. This file folder displays scorecards tabbed 11×17 and ODD having selections allowing the operator to choose from special program dialogues for 17" output greater than 9" but less than 17" and for odd size paper. The "Job Incomplete" and "Print" cases are inactive.

In the ensuing description, it is presumed that the STANDARD dialogue pathway file folder 260 has been selected by touching the tab "STANDARD". It will, however, be understood that a different one of the dialogue pathway file folders available during operation in the CURRENT JOB state may be selected by touching the tab of the file folder desired. Further, it will be understood that each of the file folders 260 includes one or more scorecards 270 with available programming selections in the form of icons, some or all of which may be the same or different from the ones discussed hereinbelow.

Referring now to FIGS. 13-22, selecting the STANDARD dialogue pathway file folder displays the PROGRAM scorecard 270 with the following selections (i.e., first level program selections) for the machine operator.

MAIN PAPER icon 302: (FIG. 13): selection of this icon in the "Job Complete" case displays, in work selection area 240, icons 406, 408, 410, and 412 representing the machine paper trays 74 (#1), 78 (#2), and 82 (#3), and "Auto Switch" (i.e. Trays 1 and 3). By selecting one of the tray icons, the operator chooses the tray from which paper will be fed for the main body of the job. Selections in the "Job Incomplete" and "Print" cases are the same.

Additionally, various paper stocks may be displayed in work selection area 240 through actuation of a STOCK BUTTON icon (not shown). In the example shown in FIG. 10, the stock types that are displayed are "standard" (icon 422), "drilled" (icon 424), "transparent" (icon 426), 8.7 to 9 inches (icon 428), "tabs" (icon 430), "11×17" (icon 431), and "odd" (icon 432). The stock type selection applies to the paper tray icon 406, 408, or 410 that is currently displayed in full color. The "Job Incomplete" case is the same while the "Print" case" is limited to changing the stock for trays not in use.

FRONT COVER icon 304: selection of this icon in the "Job Complete" case displays the paper tray icons 408 and 410 in work selection area 240 to allow the operator to select the paper tray (i.e., #2, or 3) from which the stock will be fed for the Front Cover. Selection of paper tray #1 is inhibited. The operator can also specify the number of sides of the cover to be imaged by selecting SIDES IMAGED icon 314. This selection is unavailable during the "Job Incomplete" and "Print" cases.

BACK COVER icon 306: selection of this icon is the same as that of the FRONT COVER icon described above.

REDUCE/ENLARGE icon 308: (FIG. 14): selection of this icon in the "Job Complete" case displays, in work selection area 240, a series of PRESET buttons 442-0, 442-1, 442-2, ... 442-n (representing preset reductions or enlargements), and VARIABLE control 444 (permitting variable size selection). The reduction selected will be reflected as a percentage in a display window 446. The operator can use VARIABLE control 444 to alter a selected PRESET value, pressing VARIABLE control 444 de-selecting the PRESET button that has been selected. This selection is the same in the "Job Incomplete" case and unavailable in the "Print" case.

SIDES IMAGED icon 310: (FIG. 15): selection of this icon in the "Job Complete" case displays various side imaging options available in the form of 1 sided or 2 sided (DOCUMENT) and 1 sided or 2 sided (COPY). These icons allow the operator to select 1 or 2 sided copies. This selection is unavailable in either the "Job Incomplete" or "Print" cases.

SHIFT icon 312: (FIG. 16): selection of this icon in the "Job Complete" case displays the various image shift options available to the operator for 1-sided and/or 2-sided copies in the work selection area 240. Bi-directional scroll functions 460, 462 are displayed for side 1 and/or side 2 shift, with windows 464, 466 for displaying the actual amount by which the image is shifted. Animated picture displays 467, 468 show the relative direction and amount of shift. This selection is the same in the "Job Incomplete" case and unavailable in the "Print" case.

TRIM icon 314: (FIG. 17): selection of this icon in the "Job Complete" case displays the image trimming options available to the operator in work selection area 240. These include NORMAL and COPY ALL icons 470, 472 respectively, together with LEFT EDGE, RIGHT EDGE, and BOTTOM EDGE displays 474, 476, 478 respectively for displaying the amount of the trim. LEFT, RIGHT, and BOTTOM bi-directional scrolling controls 480, 482, 484 respectively are provided to effect the trimming operation, with an animated picture 490 to indicate the relative direction and amount of trim. This selection is the same in the "Job Incomplete" and unavailable in the "Print" case.

COPY QUALITY icon 316: (FIG. 18): selection of this icon in the "Job Complete" case displays a series of preset values in the form of images, identified here as STANDARD (icon 500), LIGHT (icon 502), PHOTO (icon 504), DARK (icon 508), HALFTONE (icon 510), BLUE TEXT (icon 512), and PASTE UP (icon 514). An exposure control 516 (COPY IMAGE) with associated scale representation 518 and SPECIAL CONTROL button 520 are also shown to allow adjustments by the operator. Actuation of the SPECIAL CONTROL button 520 displays in work selection area 240 special copy controls in the form of COPY LINES control 521 with an associated scale 522, a COPY SOLIDS control 524 with an associated scale 526, and a PHOTO:COPY TONES control 528 with an associated scale 530 together with PRESET and RESET buttons 534, 536 respectively. Buttons 534, 536 display currently selected values and in cooperation with controls 521, 524, 528 permit changes to be made by the operator to exposure, contrast, and photo contrast. This selection is the same in both the "Job Incomplete" and "Print" cases.

OUTPUT icon 318: (FIG. 20): selection of this icon in the "Job Complete" case divides the work selection area 240 into COLLATED/UNCOLLATED and TOP TRAY/FINISHER areas. In the COLLATED/UNCOLLATED area, there is displayed stacker collated and uncollated icons 540, 542. In the TOP TRAY/FINISHER area, there are various finishing options, illustrated here by icon 550 representing "top tray", and icon 551 representing "no finish", 552 representing "1 staple", icon 554 representing "2 staples", icon 556 representing "landscape staple", and icon 558 representing "bind". This selection is the same in the "Job Incomplete" case and unavailable in the "Print case".

RETRIEVED PROGRAMS icon 320: (FIG. 21): selection of this icon in the "Job Complete" case provides the operator with the method to return previously Saved Programs to the scorecard to be reviewed or modified. On selection of icon 320, the current program values remain on the scorecard and plural icons 580-1, 580-1, 580-2, 580-n are displayed. When one of the icons 580-1, 580-1, 580-2, 580-n is pressed, the last job saved in the selected icon enters the scorecard, displaying the last file folder tab/scorecard tab programmed while icon 320 displays the selected icon number. Programming previously in the scorecard is lost if not a SAVED PROGRAM. The copy quantity keyboard 230 (FIG. 5) is used to adjust previous selections made in the Saved Program. This selection is unavailable in the "Job Incomplete" and "Print" cases.

Figure 22:
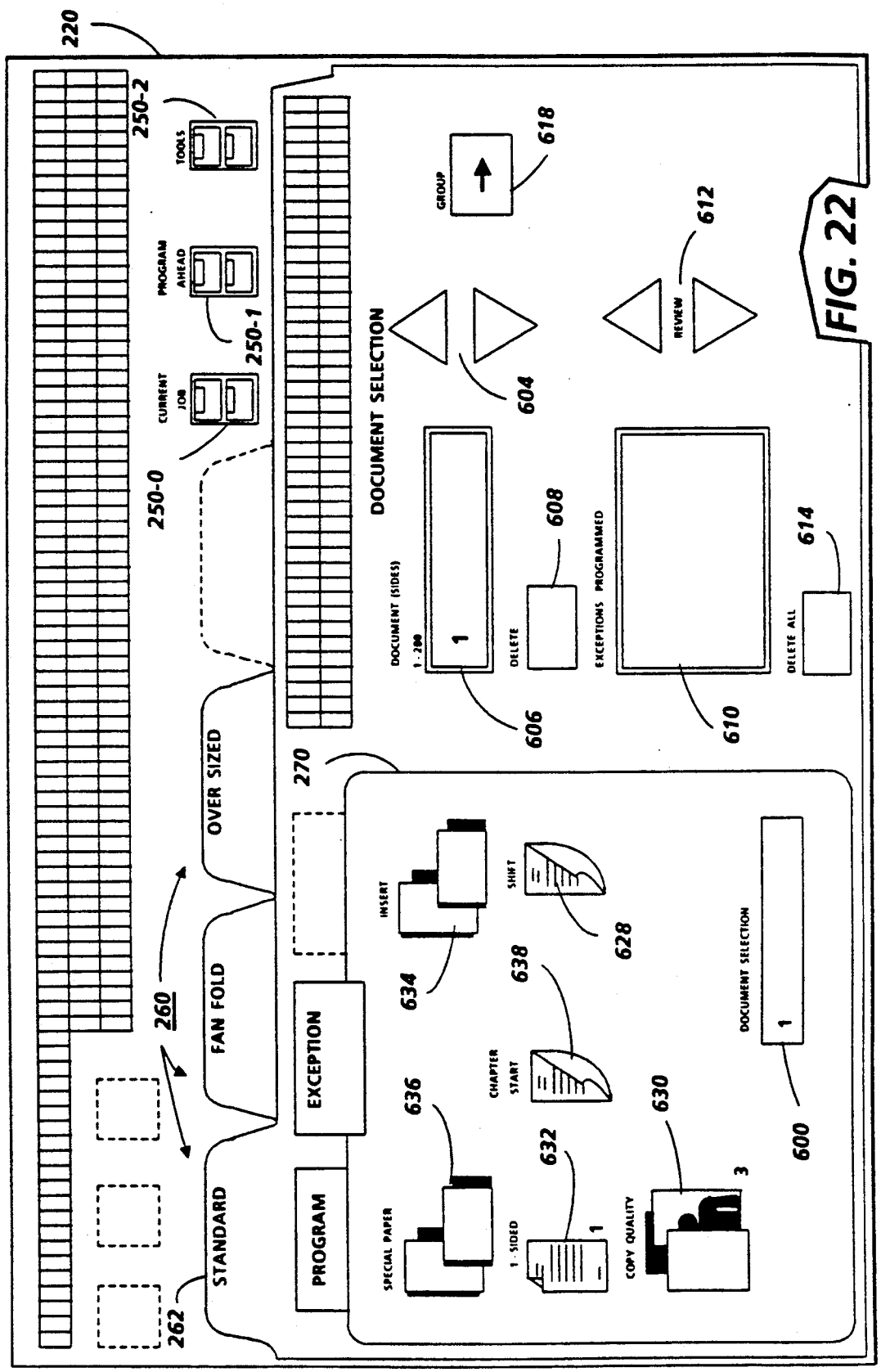
FIG. 22 is a front view of the touch monitor screen shown in FIG. 10 depicting the touch selection exception programming icons that are displayed on selection of the EXCEPTION scorecard.

Referring to FIG. 22, a second scorecard 270 tabbed EXCEPTION is also included with the STANDARD dialogue pathway file folder 260. This scorecard permits unique programming, referred to herein as exception programming, for individual pages or groups of pages within a job. The Exception Programming features are accessed by pressing the EXCEPTION tab which causes both the EXCEPTION scorecard to appear in the features selection area 238 of screen 222 and a Document Selection Work Area to appear in work selection area 240. (This work area also appears if the DOCUMENT SELECTION Icon 600 on the EXCEPTION scorecard is pressed while in a Feature work area).

The Document Selection work area provides the following displays:

Document Selection Scroll Buttons 604: these allow the operator to select a desired page number, the selected page number being shown in DOCUMENT (SIDE) Window 606.

DELETE Button 608: permits the operator to delete the selected page number.

DELETE ALL Button 614: permits the operator to delete all exception pages.

REVIEW SCROLL Buttons 612: permits the operator to review pages in the EXCEPTIONS PROGRAMMED window 610 or to review the programming of all the documents which contain exceptions. The operator can also scroll through a wrap-around list of pages with associated sides, which in duplex will wrap from 1 up to the maximum number of pages including all side 2's that can be accomplished by the machine document handler 26. When in simplex, only side 1's are displayed.

GROUP Button 618: permits the operator, after a page number is entered, to expand to a group of pages. When button 618 is pressed, an arrow appears in page window 606 and the scroll buttons 604 now act upon numbers in the right side of the window.

The EXCEPTION programming scorecard displays the following programming selections to the operator:

DOCUMENT SELECTION icon 600: selection of this icon in the "Job Complete" case provides the operator with access to the Document Selection work area and displays the number of the page currently being displayed in the scorecard. This icon is unavailable in the "Job Incomplete" and "Print" cases.

SHIFT icon 628: same as SHIFT icon 312 in the PROGRAM scorecard.

COPY QUALITY icon 630: same as COPY QUALITY icon 316 in the PROGRAM scorecard. This icon is unavailable in the "Job Incomplete" and "Print" cases.

1 SIDED icon 632: functions in a similar manner as the SIDES IMAGED icon 310 in the PROGRAM scorecard. This icon is unavailable in the "Job Incomplete" and "Print" cases.

INSERT icon 634: allows the operator to select the tray from which inserts will be fed (NON IMAGED).

SPECIAL PAPER icon 636: allows the user to select the tray from which the paper will be fed for copying. This icon is unavailable in the "Job Incomplete" and "Print" cases.

CHAPTER START icon 638: allows the operator to designate that the beginning of a chapter in a 1:2 Sides-Imaged program should be printed face-up. This icon is unavailable in the "Job Incomplete" and "Print" cases.

On exit from an icon or scorecard or file folder, the last state of the exited item is retained in memory 115.

While the preceding description has described operation of U.I. 213 in the CURRENT JOB state entered by touching soft touch button 250-0 on screen 220, it will be understood that other suitable dialogue pathway file folders with scorecards may be displayed on screen 222 by entering one of the PROGRAM AHEAD, TOOLS, FAULTS, or INFORMATION states. These states are entered by touching of touch button 250-1 (PROGRAM AHEAD) or button 250-2 (TOOLS), or in the event a fault occurs (FAULT), or be pressing hard button "i" (INFORMATION) on bezel 218.

For a more detailed description, reference is made to pending application Ser. No. 07/164,365 filed Mar. 3, 1988 and incorporated herein.

Figure 23:
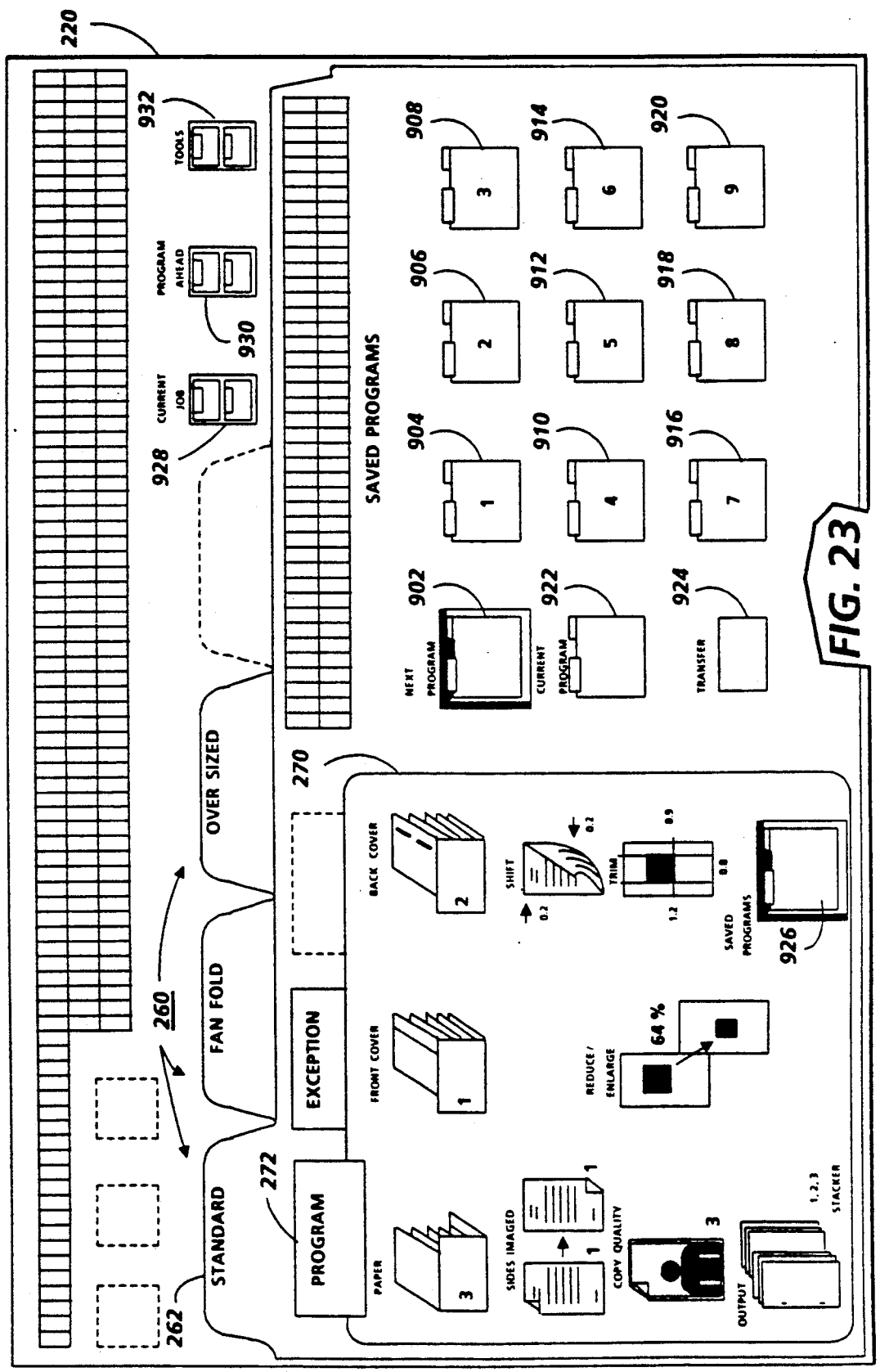
FIG. 23 is a front view of the touch monitor screen shown in FIG. 10 depicting the touch selection pre-programming feature in accordance with the present invention.

With reference to FIG. 23, the program ahead feature allows the preprogramming of forty separate jobs, four different jobs in each of ten different preprogramming memory slots. This preprogramming feature can be used at any time, including when the current job is running or when the machine is warming up. Once the operator screen appears, preprogramming can be initiated using the program ahead feature. As a simple example of how the preprogramming feature works while the machine is in operation, consider the following example. The operator has two jobs to complete. Job number 1 is to make one hundred one-sided copies of an 8.5×11" document. Job number 2 is to make fifty one-sided to two-sided copies of an 8.5×11" document with 98% reduction. It should be noted that the four copy jobs that can be programmed in each of the nine preprogramming slots and the Next Program slot include one standard, one fanfold, and two oversized jobs.

Assume that job number 1 has been programmed into the machine and that the operator has initiated the start of copy job number 1 by activating a start button. The procedure to preprogram the next job while the first job is being run is the following. While the current job is running, touch the Program Ahead file cabinet 930 on the screen as illustrated in FIG. 23. This will display the Next Program folder 902 and the nine Saved Program slots or folders 902-920 in the work area. Upon touching the Next Program folder 902 in the work area, the score card will display the last job that was preprogrammed into the Next Program slot. For example, if the last job that had been preprogrammed and placed into the Next Program 902 slot required a 64% reduction and two-sided imaging in the standard format, the score card will display that the last program was two-sided imaging and a 64% reduction in the standard format.

Assuming that the job to be preprogrammed is a standard job and not fanfold or an oversized job, the standard file folder is selected as well as the program score card tabs in the scorecard area, as illustrated. The operator will then select the features for Next Program, in particular, the quantity of fifty, and also one-sided to two-sided copies and 98% reduction. To exit Program Ahead, it is only necessary to touch either Current Program 928 file cabinet or the Tools 932 file cabinet. The system automatically stores the preprogram job features in Next Program as selected.

After job 1 is completed, it is necessary to return to Current Program file cabinet 922 to run the Next Program job using the following retrieve procedures. The Saved Program folder 926 in the scorecard area allows the operator to retrieve and run up to four copy jobs in any of the preprogram slots, in this case the Next Program slot. The operator must be in the Current Program 928 file cabinet to use the saved program feature. In order to run job 2, therefore, the operator must select the current program 928 file cabinet, the standard file folder and the program score card tab. The operator then touches the Saved Program 926 feature in the feature score card area. The work area screen will then reflect a copy of the one to nine numbered files that are in the Program Ahead file. This is the screen display even though the system is still in Current Program 928. The operator will then touch Next Program 902 in the work area and then select the correct file folder in which the program has been saved. Note that the program feature score card area will change to reflect the copy job that was just programmed into Next Program. Also, note that if the operator failed to select a file folder, and there is more than one job saved in the file, the last job programmed will be the first job displayed. At this point, the operator positions the documents and presses the start button to run job number 2.

In accordance with one feature of the present invention, it is possible to transfer a copy job from Next Program or Current Program to another program slot. It is only necessary to select the file to be transferred, touch Transfer 924 in the work are, and touch the destination file. Transfer 924 automatically copies the job to the destination file. For example, Transfer 924 transfers the file in Next Program 902 or Current Program 922 to a selected numbered file 904-920. That is, the operator touches one of the 1 to 9 numbered files in the work area, for example slot #5, folder 912. The job in Next Program will then automatically transfer to slot #5 and is permanently saved.

To be able to save and retrieve the copy job in progress, that is the current program, it is necessary to follow the following steps. While the job is being run, it can be saved by using the Program Ahead feature, either following the programming of the job, while the job is in progress or when the job is complete. For example, after the copy jobs starts, touch Program Ahead 930, and then touch Current Program 922 in the work area. Next, touch Transfer 924 in the work area to automatically transfer copies of a job from one file to another. Then touch one of the 1 to 9 numbered files, 902-920 in the work area, for example, #3 slot 908. The program will automatically transfer to slot #3 and be saved for running at another time. It should be noted that any previously saved programs in slot #3 will be replaced with the new program. Then touch Current Program 928 or Tools 932 to leave Program Ahead 930.

To retrieve the current program, be sure that Current Program 928, the Standard file folder and the Program score card are selected. Then touch Saved Programs 926 in the score card area. Note that while still in Current Program, the work area screen will change to reflect a copy of the 1 to 9 numbered files in Program Ahead. Next, touch the numbered file or slot 902-920 containing the saved program, for example folder 908. Note that the saved or retrieved program feature now reflects the slot number, and the features in the program features score card area are those of the saved copy job. Position the documents and press start to begin the new program.

To save, and transfer a copy of a job for future use from any one of the files 902-920 to any other of the files 902-920, the procedure is, similar to the procedure for Next Program. With this feature, up to thirty-six different jobs, that is, standard, fanfold, over-sized 11×17 and oversized odd-sized can be programmed in each of the nine numbered slots. Once a job has been saved, it can be run on an as needed basis. Programmed copy jobs can be saved permanently, saved until replaced with a new job, or deleted from the file using a (not shown) clear memory button.

Programs can be saved and transferred from one slot to another whether or not another job is running. To save a job for future use, operators must be in Program Ahead 930. That is, after touching Program Ahead, the operator touches one of the 1 through 9 numbered slots, for example #8, folder 918, and makes selections in the program feature score card area for the copy job. The selections are automatically saved in the numbered file. Again, to transfer a pre-programmed file from one slot to another it is only necessary to select the file to be transferred, touch Transfer 924 in the work are, and touch the destination file. Transfer 924 automatically copies the job to the destination file. For example, Transfer 924 can transfer the file in slot number 904 to a selected numbered file. That is, if the operator touches one of the 1 to 9 numbered files in the work area, for example slot #5, folder 912. The job in slot number 904 will then automatically transfer to slot 910 and is permanently saved.

To run the newly programmed job, for example in slot #8 folder 918, it is necessary to return to Current Program to retrieve and run the job. The procedure is the same for retrieving a saved or current program. Operators must be in the Current Program 930 file to use the Saved Program 926 feature. Make sure the Current Program, Standard folder and Program score card are selected. Touch Saved Programs 926 in the program feature score card. Notice that the work area again reflects a copy of the 1 through 9 numbered slots. Touch the numbered slot, for example #8 folder 918, containing the program. Then select the file folder in which the program is saved, that is, Standard, Fanfold, or Oversized. This is necessary because there could be up to four jobs saved in the same file, and the last job programmed is the first job displayed when the numbered file or slot is selected. Note that the retrieved program in the feature score card reflects the file number and the features of the saved copy job. Next, select he copy quantity, select or verify the paper type and trays and press start.

In accordance with the present invention, similar remote reproduction machines can be pre-programmed for a plurality of job runs by transferring the pre-programmed jobs in the slots in memory to a floppy disk. The operator can merely load a floppy disk into the disk drive 115B and transfer any selected job requirement in one of the slots 902-920 to the floppy disk by use of Transfer 924. The floppy disk can then be loaded into disk drive 115B of another machine 5 to automatically run jobs in response to the information stored on the floppy disk. The general process for transferring a job to a floppy disk at a console or station having a touch-screen display includes the steps of:

1) Loading a floppy disk into the floppy disk drive.
2) Displaying on the console touchscreen icon representations of pre-programmed program slots including a floppy disk icon.
3) Selecting a particular icon representation of a pre-programmed job requirement (the source).
4) Touch selecting the Transfer icon to initiate a transfer operation.
5) Selecting the floppy disk icon on the touchscreen (the destination) to transfer the selected programmed job requirement to the floppy disk.

The floppy disk can then be loaded into the disk drive of another machine and the programmed job requirement on the floppy disk transferred to the control of that machine using the following general process:

1) Displaying on the console touchscreen icon representations of pre-programmed program slots including the floppy disk icon.
2) Touching the floppy disk icon (the source). This operation automatically initiates the transfer operation.
3) Selecting a particular icon representation of a pre-programmed job requirement. (The destination). This will transfer the pre-programmed job requirement from the floppy disk to the selected pre-programmed slot.

The general procedure to transfer a job requirement from one programming slot to another programming slot includes the steps of:

1) Displaying on the console screen the icon representation of the pre-programmed slots.
2) Selecting a first pre-programmed slot (the source).
3) Selecting the transfer icon on the console screen.
4) Selecting a second pre-programmed slot (the destination) to transfer the job requirement from the first slot to the second slot.

The floppy disk could then be transferred to a remote machine operator console disk drive for programming the machine to run a plurality of jobs, or the floppy disk could be stored for programming a machine at a later time.

While the invention has been described with reference to the structure disclosed, it is not confined to the details set forth, but is intended to cover such modifications or changes as may come within the scope of the following claims.

We claim:

1. In a reproduction machine having a programming device actuated by an operator to pre-program a plurality of discrete set-up configurations in order that the machine execute jobs in accordance with a selected one of the set-up configurations, the programming device comprising:
   a screen providing a display of selections for programming said plurality of discrete set-up configurations of said machine;
   a memory means having a plurality of locations for storing each of said set-up configurations;
   means effective when actuated by the operator for selecting a desired one of said stored set-up configurations to configure said machine in accordance with the selected configuration and;
   means for transferring a set-up configuration from a first memory location to a second memory location.

2. The device of claim 1 wherein said second memory location is located on a removable memory.

3. The device of claim 1 including means selectively actuatable by the operator for changing portions of one of said set up configurations in a first memory location and for transferring to a second memory location during a job execution.

4. The device of claim 1 including a controller, a touch responsive means having a plurality of operator actuatable switches for recalling a desired one of the set-up configurations stored in memory in a first location and transferring the set-up configuration to a second location in memory.

5. The device of claim 4 wherein the second location is on a floppy disk.

6. The device of claim 1 wherein the screen includes a plurality of dedicated machine operating function switches which when actuated provide instructions corresponding to the preselected function switch for a job run and further includes an operator actuatable program transfer switch which is actuated by the operator after actuation of function switches relating to a set-up configuration to cause said memory means to store said configuration in said memory during the execution of a job corresponding to another set-up configuration.

7. In a reproduction machine having plural interactive sub-systems cooperable to produce copies from document originals, the combination of:

a) means for displaying programming selections for pre-programming a plurality of discrete job requirements for said machine;

b) a memory having a plurality of memory slots, each of said slots storing one of the discrete job requirements;

c) touch responsive means to enable programming selections touched to be stored in the slots in said memory; and d) means responsive to said touch responsive means to enable a first job requirement stored in a first slot in memory to be transferred and stored in a second slot in memory.

8. Apparatus allowing a user to interactively program a copying/printing machine for a future job run while the machine is concurrently operating on a current job run comprising:

a video screen;

programming means for providing a display on the video screen;

touchscreen interaction means for allowing an operator to interact with the programming means by touching the display displayed by the video screen at selected points;

means for converting said touch selections to requirements for a future job run; and, means for transferring the requirements for a future job run to a removable memory means.

9. A method for transferring pre-programmed reproduction machine jobs involving a variety of machine features and requirements from a first memory location to a second memory location comprising the steps of:

touching a program ahead file on the screen, displaying a simulation of a plurality of machine features selecting a plurality of machine features for a specific job requirement, storing the plurality of machine features for the specific job requirement in the first memory location, touching a transfer file on the screen, touching a second memory location file on the screen, and automatically storing in the second memory location said plurality of features for said specific job requirement.

10. The method of claim 9 including the step of storing in the second memory location said plurality of features for said specific job requirement while the current job is in progress.

11. In an image processing apparatus having image processing means for forming an image; means for displaying information relating to image formations; a first memory medium capable of storing a plurality of program requirements in discrete memory locations for controlling the image processing means, each of the program requirements providing a discrete set-up configuration in order that the apparatus produce production runs in accordance with a selected one of the set-up configurations, a second memory medium being removably provided in said image processing apparatus; the method of transferring a program requirement from a memory location in the first memory to the second memory comprising the steps of:

loading the second memory medium into the image processing apparatus, selecting a program requirement to be transferred, selecting a transfer function on the means for displaying, and transferring the selected program requirement to the second memory medium.

12. The method of claim 11 including the steps of removing the second memory medium from the image processing apparatus, and loading the second memory medium in another image processing apparatus.

13. In an image processing apparatus having image processing means for forming an image; means for displaying information relating to image formations, a first memory medium capable of storing a plurality of pre-programs for controlling the image processing means, each of the pre-programs providing a discrete set-up configuration in order that the apparatus produce production runs in accordance with a selected one of the set-up configurations, a second memory medium removably provided in said image processing apparatus; the method of transferring pre-programs from the first memory to the second memory comprising the steps of:

pre-programming the first memory medium to provide said plurality of programs providing said discrete set up configurations, loading said second memory medium into said image processing apparatus, transferring selected pre-programs from the first memory medium to the second memory medium, removing the second memory medium from the image processing apparatus, and selecting a desired one of said stored set-up configurations in the second memory medium to configure another image processing apparatus in accordance with the selected configuration.

14. A process for programming a reproduction machine including programming means, a removable memory means, and a screen simulating job requirements for a plurality of jobs, comprising the steps of:

a) activating selected job requirements simulated on said screen for a first job run;

b) activating selected job requirements simulated on said screen for a second job run;

c) storing said selected job requirements on said removable memory means;

d) removing said memory means from the machine; and e) loading the memory means into another reproduction machine to run a selected job run.

15. The process according to claim 14 wherein the memory means is a disk memory including the step of loading the disk memory in a disk drive incorporated in the reproduction machine.

* * * * *